United States Patent
Mildh et al.

(10) Patent No.: US 12,363,770 B2
(45) Date of Patent: Jul. 15, 2025

(54) SUPPORTING IAB CP SIGNALING OVER LTE

(71) Applicant: TELEFONAKTIEBOLAGET LM ERICSSON (PUBL), Stockholm (SE)

(72) Inventors: Gunnar Mildh, Sollentuna (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 17/635,642

(22) PCT Filed: Aug. 14, 2020

(86) PCT No.: PCT/IB2020/057696
§ 371 (c)(1),
(2) Date: Feb. 15, 2022

(87) PCT Pub. No.: WO2021/028884
PCT Pub. Date: Feb. 18, 2021

(65) Prior Publication Data
US 2022/0295579 A1 Sep. 15, 2022

Related U.S. Application Data

(60) Provisional application No. 62/887,383, filed on Aug. 15, 2019.

(51) Int. Cl.
*H04W 76/12* (2018.01)
*H04W 24/04* (2009.01)
*H04W 80/00* (2009.01)
*H04W 88/08* (2009.01)

(52) U.S. Cl.
CPC .......... *H04W 76/12* (2018.02); *H04W 24/04* (2013.01); *H04W 80/00* (2013.01); *H04W 88/08* (2013.01)

(58) Field of Classification Search
CPC ..... H04W 24/02; H04W 76/12; H04W 24/04; H04W 80/00; H04W 88/08
See application file for complete search history.

(56) References Cited

U.S. PATENT DOCUMENTS

2020/0007223 A1* 1/2020 Zhu ........................ H04W 16/26

FOREIGN PATENT DOCUMENTS

| CN | 106879262 A | 6/2017 |
|---|---|---|
| CN | 110035042 A | 7/2019 |
| WO | 2018175817 A1 | 9/2018 |

OTHER PUBLICATIONS

ZTE ("Control plane signaling delivery in NSA deployment", 3GPP TSG RAN WG3 Meeting #101Bis, R3-185536, Oct. 8-12, 2018) (Year: 2018).*

(Continued)

*Primary Examiner* — Ji-Hae Yea
(74) *Attorney, Agent, or Firm* — Ericsson Inc.

(57) ABSTRACT

A method by a first network node in an Integrated Access and Wireless Access Backhaul (IAB) network is provided. The method includes, in the absence of an New Radio (NR) link between the first network node and a second network in the IAB network, sending, to the second network node over Long Term Evolution, LTE, radio, one or more Stream Control Transmission Protocol/Internet Protocol (SCTP/IP) packets. The one or more SCTP/IP packets includes F1-Application Protocol (F1-AP) signaling.

26 Claims, 16 Drawing Sheets

(56) References Cited

OTHER PUBLICATIONS

3GPP TR 38.874 V16.0.0 (3GPP TR 38.874 V16.0.0, Dec. 2018) (Year: 2018).*

LG Electronics Inc. (Handling of the RLF on wireless backhaul link, 3GPP TSG-RAN2 Meeting RAN2#103, R2-1812820, Aug. 20-24, 2018) (Year: 2018).*

ZTE, Sanechips (Consideration on IP Address Allocation in IAB, 3GPP TSG RAN WG3 NR#103, R3-190544, Feb. 25-Mar. 1, 2019) (Year: 2019).*

Samsung ("Further discussion on IP address issues of IAB network", 3GPP TSG-RAN WG3 Meeting #104, R3-192608, May 13-17, 2019) (Year: 2019).*

Samsung ("IP address management over IAB network", 3GPP TSG-RAN WG3 Meeting #103bis, R3-191552, Apr. 8-12, 2019) (Year: 2019).*

ZTE et al., "Control plane signaling delivery in NSA deployment," R2-1817420, 3GPP TSG RAN WG2 Meeting #104, Spokane, USA, Nov. 12-16, 2018.

AT&T, "TP on IAB with NSA operation," R3-186263, 3GPP TSG-RAN WG3 #101bis, Chengdu, China, Oct. 8-12, 2018.

KDDI Corporation, et al., "Consideration on CP alternatives for architecture 1a," R3-185400 (Revision of R3-184587), 3GPP TSG-RAN WG3 #101bis, Chengdu, China, Oct. 8-12, 2018.

Samsung, "IP address management over IAB network," R3-191552, 3GPP TSG-RAN WG3 Meeting #103bis, Xi'an, China, Apr. 8-12, 2019.

AT&T, "Delivery of control plane signaling to IAB nodes in NSA deployment", 3GPP TSG-RAN WG2 Meeting #106, R2-1907377, May 13-May 17, 2019, 4 Pages, Reno, USA.

Qualcomm, "New WID: Integrated Access and Backhaul for NR", 3GPP TSG RAN Meeting #82, RP-182882, (Revision of RP-182810), Dec. 10-13, 2018, 7 Pages, Sorrento, Italy.

* cited by examiner

SUPPORTING IAB CP SIGNALING OVER LTE

This application is a 371 of International Application No. PCT/IB2020/057696, filed Aug. 14, 2020, which claims the benefit of U.S. Provisional Application No. 62/887,383, filed Aug. 15, 2019, the disclosures of which are fully incorporated herein by reference.

TECHNICAL FIELD

The present disclosure relates, in general, to wireless communications and, more particularly, systems and methods for supporting integrated access and wireless access backhaul (IAB) Control Plane (CP) Signaling over Long Term Evolution (LTE).

BACKGROUND

The $3^{rd}$ Generation Partnership Project (3GPP) is currently standardizing integrated access and wireless access backhaul (IAB) in New Radio (NR) in Release 16 (RP-RP-182882).

The use of short range mmWave spectrum in NR creates a need for densified deployment with multi-hop backhauling. However, optical fiber to every base station will be too costly and sometimes not even possible (e.g., at historical sites). A main IAB principle is the use of wireless links for the backhaul (instead of fiber) to enable flexible and very dense deployment of cells without the need for densifying the transport network. Use case scenarios for IAB can include coverage extension, deployment of a massive number of small cells, and fixed wireless access (FWA) (e.g., to residential/office buildings). The larger bandwidth available for NR in mmWave spectrum provides opportunity for self-backhauling without limiting the spectrum to be used for the access links. On top of that, the inherent multi-beam and multiple-input multiple-output (MIMO) support in NR reduce cross-link interference between backhaul and access links allowing higher densification.

During the study item phase of the IAB work (a summary of the study item can be found in the technical report 3GPP TR 38.874), it has been agreed to adopt a solution that leverages the Central Unit (CU)/Distributed Unit (DU) split architecture of NR, where the IAB node hosts a DU part that is controlled by a central unit. The IAB nodes also have a Mobile Termination (MT) part that they use to communicate with their parent nodes.

The specifications for IAB strives to reuse existing functions and interfaces defined in NR. In particular, MT, gNodeB-Distributed Unit (gNB-DU), gNodeB-Central Unit (gNB-CU), User Plane Function (UPF), Access and Mobility Management Function (AMF), and Session Management Function (SMF) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 1 illustrates a high-level architectural view of an IAB network. More particularly, FIG. 1 shows a reference diagram taken from 3GPP TR 38.874 for IAB in standalone mode, which contains one IAB-donor and multiple IAB-nodes. The IAB-donor is treated as a single logical node that comprises a set of functions such as gNodeB-Distributed Unit (gNB-DU), gNodeB-Central Unit-Control Plane (gNB-CU-CP), gNodeB-Central Unit-User Plane (gNB-CU-UP) and potentially other functions. In a deployment, the IAB-donor can be split according to these functions, which can all be either collocated or non-collocated as allowed by 3GPP Next Generation-Radio Access Network (NG-RAN) architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user protocol stack for IAB in Rel-16. FIGS. 3A-3B illustrate the baseline control plane protocol stacks for IAB in Rel-16. As shown in the figures, the chosen protocol stacks reuse the current CU-DU split specification in Release 15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and Datagram Transport Layer Security (DTLS) in the case of Control Plane (CP)). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the User Equipment (UE) bearer data to the proper backhaul Radio Link Control (RLC) channel (and also between ingress and egress backhaul RLC channels in intermediate IAB nodes) to satisfy the end-to-end Quality of Service (QoS) requirements of bearers.

At the RAN2 #105 meeting, the modelling of the Adaptation layer was discussed and the following was agreed:

- RAN2 confirms that routing and bearer mapping (e.g. mapping of BackHaul (BH) RLC channels) are adaptation layer functions
- R2 assumes that Transmission (TX) part of adaptation layer performs routing and "bearer mapping", Reception (RX) part of adaptation layer performs "bearer demapping"
- R2 assumes that Service Data Units (SDUs) are forwarded from RX part of adaptation layer to TX part of adaptation layer (for the next hop) for packets that are relayed by the IAB node.
- How to model with regard to protocol entities, e.g. whether separate for DU and MT or not, and how these are configured, F1-AP or Radio Resource Control (RRC), was left for future study.

Though there is no final agreement in RAN2, there is a consensus about including the BAP entity in both MT and DU parts of the IAB-node protocol stack. Modelling the BAP layer this way facilitates the realization of the routing and mapping functionalities of the adaptation layer.

Before discussing the operations of the two BAP entities, the first thing to consider is whether the radio bearers carrying CP/UP traffic for the MT functionality of an IAB node should be handled separately from the Back Haul Radio Link Control (BH RLC) channels. Note that the BH RLC channels are used to carry traffic to/from the IAB DU functionality, which could be either be intended for the UEs served by the IAB node or for the child IAB nodes. They (e.g., radio bearers and BH RLC channels) should be handled separately by employing different logical channel IDs.

The procedure for downlink (DL) follows:
1. When a packet arrives at the IAB donor DU (from the donor CU) and is processed first by the upper layers (as there is no MT BAP layer at the donor DU).
   a) If the packet is destined to UEs directly connected to the IAB donor DU or it is an F1-AP traffic destined at the IAB donor DU, it is forwarded to higher layers (IP/UDP/GTP-U for UP, IP/SCTP/F1-AP for CP).
   b) Otherwise (i.e., it is to be forwarded further downstream), it is forwarded to the DU BAP layer.
2. When a packet arrives at an IAB node (from a parent IAB node or IAB donor DU) via backhaul RLC channels is processed first by the MT BAP layer.
   a) If the packet is destined to UEs directly connected to the IAB node or F1-AP traffic destined at the IAB node's DU, it is forwarded to higher layers (IP/UDP/GTP-U for UP, IP/SCTP/F1-AP for CP).
   b) Otherwise (i.e., it is to be forwarded further downstream, it is forwarded to the DU BAP layer.

In both 1b and 2b above, the DU BAP will determine which route (i.e., to which child node) the packet has to be forwarded to and which BH RLC channel within that route will be used for forwarding the packet downstream (the input information for the BH RLC mapping is still discussed in RAN2).

The procedure for uplink (UL) follows:
1. When a packet arrives at the IAB donor DU (from a child IAB node) via backhaul RLC channels, it is processed first by the DU BAP layer and is forwarded to the donor CU (as the donor DU can be connected to at most one donor CU, there is no routing functionality required).
2. When a packet arrives at an IAB node in the UL direction:
   a. If it is coming from a child IAB node via backhaul RLC channels it is processed first by the DU BAP layer and, since every UL packet is destined to be forwarded to the donor CU, it is passed on to the MT BAP layer.
   b. If the packet is from a UE connected directly to the IAB node, or it is an F1-AP traffic originating from the IAB node, it is processed first by the higher layers (IP/UDP/GTP-U for UP, IP/SCTP/F1-AP for CP), and is forwarded to the MT BAP layer.

In both 2a and 2b above, the MT BAP will determine which route (i.e., which parent node) the packet has to be forwarded to and which BH RLC channel within that route will be used for forwarding the packet upstream.

FIG. 4 illustrates an example IAB node integration procedure. The setup and configuration (i.e., integration) for the IAB node is the first step in the operation of the IAB node. The integration procedure included the following steps:
1. MT Setup
   MT selects parent node (procedure is for further study (FFS)).
   MT authenticates with AMF (Uu procedures).
   AMF authorizes MT at gNB (signaling agreed at RAN3 #103).
   gNB establishes SRBs with MT (Uu procedures).
   gNB may establish Data Radio Bearers (DRBs) and Protocol Data Unit (PDU) session with MT (Uu procedures; if this is necessary is FFS).
   PDU session may be used for Operations & Maintenance (OAM) connectivity.
2. Backhaul Setup
   Establishment of BH RLC channel between IAB-node MT and parent node.
      RAN2 decided that this configuration is done by CU-CP (e.g., using Radio Resource Control (RRC)).
      For this, MT's CU-CP needs to know that MT belongs to an IAB node and not a UE, which it may derive, for example, from MT authorization (agreed at RAN3 #103).
      The BH RLC channel further has to be marked with the corresponding priority/QoS-class on IAB-node MT and parent node.
   Establishment of adapt route(s) between IAB-node MT and IAB-donor DU. This includes:
      Configuration of adapt routing identifier(s) on IAB-node MT and IAB-donor DU (RAN2; FFS); and
      Configuration of routing entries on all IAB-node's ancestor nodes for new routing identifier (RAN2; FFS).
   IP address allocation to IAB-node for adapt interface, which is routable from wireline fronthaul via adapt route.
      The IP address must be specific to IAB-donor DU so that CU can send IP packets to IAB-node via this specific IAB-donor DU and the new adapt route. The IAB-donor DU has to support a pool of IP addresses that are routable from wireline fronthaul for all descendant IAB-nodes.
      If IP assignment is done by CU, the CU must know IAB-donor-DU's available IP address pool for IAB nodes.
      If IP assignment is done via DHCPv4/6 with DHCP proxy on IAB-donor-DU, as proposed in TR, a transport mechanism of ARP/NDP on top of adapt layer needs to be defined.
      There may be other options for IP address allocation.
3. DU Setup
   DU establishes F1-C and cell activation using IP on adapt layer (procedure defined in TS 38.401 clause 8.5: F1 startup and cells activation).
   This includes OAM support for IAB-node DU via backhaul IP layer.

It is important to note that the recommended architecture option (Option 1a in 3GPP TR 38.874) can manage IP address assignment internally in the Radio Access Network (RAN) without Core Network (CN) involvement. In that respect, the above baseline allows for Dynamic Host Configuration Protocol (DHCP)-based IP address assignment and setting up the OAM after IP address assignment without MT establishing a PDU session. The three parts of the overall IAB node integration procedure are discussed below.
1. MT Functionality Setup The IAB node will first connect via its MT functionality using RRC setup procedure. After RRC connection setup, the MT functionality of the IAB node could perform Non-Access Stratum (NAS)-level registration and authentication, but no PDU session establishment is required, as shown in FIG. 12.

After the NAS registration, UE context for the IAB node can be created in the Radio Access Network (RAN) (without any PDU session resources). In this way, there is no need to support any SMF/UPF functionality for the IAB nodes. NAS Rel-15 already separates the NAS registration from the PDU session establishment, making it possible to only perform registration without setting up PDU sessions, as well as setting up a UE context in RAN without PDU session resources.

2. Backhaul Setup

Once the UE context for the IAB node is setup in the RAN, the RAN will establish one or more backhaul bearers that can be used for IP address assignment to IAB node. For the situations where the IAB node is not directly communicating with the IAB-Donor node, but via other (already attached/connected) IAB nodes, the forwarding information in all intermediate IAB nodes will be updated due to the setup of new IAB node.

3. DU Functionality Setup

After establishing connectivity to the operator's internal network, the DU functionality of IAB node and its cells/sectors need to be configured by the OAM before the DU can send an F1 SETUP REQUEST message to its corresponding CU (i.e., IAB-CU). The recommended architecture option for IAB supports the full IP connectivity to the IAB node, making it possible that the DU functionality can have direct IP connectivity to the OAM, instead of relying on the MT functionality to establish a special PDU session in the Core Network (CN) for OAM.

Finally, after configuring the DU functionality of the IAB node, the IAB node becomes operational as a DU and UEs will not be able to distinguish it from other gNBs. As such, it can start serving UEs like any other DU/gNB.

The procedure for initial IAB node access can be based on the UE Initial Access signaling flow with slight modifications to fulfil the IAB node requirements. Meanwhile, for activation of IAB node DU cells, the F1 Startup and cells activation procedure defined in 3GPP TS 38.401 can be reused as is. Taking the above into account, the present disclosure proposes the process for integrating the IAB node into the NG-RAN described below and shown in FIG. 12.

IAB Initial Access and MT Functionality Setup

1. The IAB node sends an RRCSetupRequest message to the gNB-DU.
2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the Cell Radio Network Temporary Identifier (C-RNTI) allocated by the gNB-DU.
3. The gNB-CU allocates a gNB-CU UE F1AP ID for the IAB node and generates RRCSetup message towards the IAB node. The RRC message is encapsulated in the DL RRC MESSAGE TRANSFER message.
4. The gNB-DU sends the RRCSetup message to the IAB node.
5. The IAB node sends the RRC CONNECTION SETUP COMPLETE message to the gNB-DU. The S-NSSAI IE in the RRC CONNECTION SETUP COMPLETE message indicates the IAB node.
6. The gNB-DU encapsulates the RRC message in the UL RRC MESSAGE TRANSFER message and sends it to the gNB-CU.
7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.
9. The gNB-CU sends the IAB CONTEXT SETUP REQUEST message to establish the IAB node context in the gNB-DU. In this message, it may also encapsulate the SecurityModeCommand message.
10. The gNB-DU sends the SecurityModeCommand message to the IAB node.
11. The gNB-DU sends the IAB CONTEXT SETUP RESPONSE message to the gNB-CU.
12. The IAB node responds with the SecurityModeComplete message.
13. The gNB-DU encapsulates the RRC message in the UL RRC MESSAGE TRANSFER message and sends it to the gNB-CU.
14. The gNB-CU generates the RRCReconfiguration message and encapsulates it in the DL RRC MESSAGE TRANSFER message. The RRCReconfiguration could include a configuration of one or more IAB backhaul bearers.
15. The gNB-DU sends RRCReconfiguration message to the IAB node.
16. The IAB node sends RRCReconfigurationComplete message to the gNB-DU.
17. The gNB-DU encapsulates the RRC message in the UL RRC MESSAGE TRANSFER message and sends it to the gNB-CU.
18. The gNB-CU sends the INITIAL CONTEXT SETUP RESPONSE message to the AMF.

IAB Node DU Cells Activation

At this point, the IAB node will have established one or more backhaul bearers that can be used for creating Transport Network Layer (TNL) connectivity toward gNB-CU and getting TNL address (e.g., IP address and port assignments). Next, the IAB node can utilize the F1 Startup and Cells Activation procedures described in TS 38.401 to activate its cells and become operational.

IAB Node Ready to Serve UEs

After activating its cells, the IAB node is operational and can serve the UEs. The UEs can connect to the IAB node via the UE Initial Access procedure described in TS 38.401.

Bearer Mapping in IAB Networks

An IAB-node needs to multiplex the UE DRBs to the BH RLC-Channel. The following two options can be considered on bearer mapping in IAB-node.

The first option is a one-to-one mapping between UE DRB and BH RLC-channel FIG. 5 illustrates an example of one-to-one mapping between UE DRB and BH RLC-channel According to this option, each UE DRB is mapped onto a separate BH RLC-channel. Further, each BH RLC-channel is mapped onto a separate BH RLC-channel on the next hop. The number of established BH RLC-channels is equal to the number of established UE DRBs.

Identifiers (e.g. for the UE and/or DRB) may be required (e.g. if multiple BH RLC-channels are multiplexed into a single BH logical channel). Which exact identifiers are needed, and which of these identifier(s) are placed within the adaptation layer header depends on the architecture/protocol option.

The second option is a many-to-one mapping between UE DRBs and BH RLC-channel FIG. 6 illustrates an example of many-to-one mapping between UE DRBs and BH RLC-channel. For the many-to-one mapping, several UE DRBs are multiplexed onto a single BH RLC-channel based on specific parameters such as bearer QoS profile. Other information such as hop-count could also be configured. The IAB-node can multiplex UE DRBs into a single BH RLC-channel even if they belong to different UEs. Furthermore, a packet from one BH RLC-channel may be mapped onto a different BH RLC-channel on the next hop. All traffic mapped to a single BH RLC-channel receive the same QoS treatment on the air interface.

Since the BH RLC-channel multiplexes data from/to multiple bearers, and possibly even different UEs, each data block transmitted in the BH RLC-channel needs to contain an identifier of the UE, DRB, and/or IAB-node it is associated with. Which exact identifiers are needed, and which of these identifier(s) are placed within the adaptation layer header depends on the architecture/protocol option.

It has been agreed to support both N:1 and 1:1 mapping in Release 16.

For 1:1 bearer mapping, it has been agreed to use the IPv6 Flow Label field, where the donor DU is configured to mapping IP packets that are marked with a given flow label to a particular LCID on the first backhaul link between the donor DU and the first downstream IAB node. For the case of N:1 mapping, the working assumption is the DSCP field in the IP header can be used for the mapping purpose (in order to support also IPv4 networks). However, there is a discussion whether to have a unified behavior where the IPv6 Flow Label can be used for N:1 mapping as well. It is also be considered to use the combination of the flow label and the DSCP field to use for 1:1 mapping IAB Deployment in Evolved-Universal Terrestrial Radio Access Network-New Radio—Dual Connectivity (EN-DC) Mode IAB is a feature where an NR radio base station (IAB Node) is being backhauled via an NR radio link towards a Donor radio base station (gNB). It has been agreed to support IAB using NR Stand-Alone operation, as well as Non-Stand-Alone (NSA) operation where the IAB Node is also connected to Long Term Evolution (LTE) radio interface and LTE radio base station for handling control plane signaling.

Under NSA NR deployment, an IAB network has to operate in EN-DC mode (i.e., LTE as a master and NR as a secondary node). FIG. 11 illustrates an example of IAB deployment in EN-DC mode. It has been agreed in 3GPP that the NR traffic will be backhauled over the NR leg and the LTE traffic has to pass through the LTE leg (i.e., no NR traffic sent over the LTE leg or vice versa).

There currently exist certain challenges. For example, there have been proposals for IAB Nodes operating in Non-Stand-Alone mode to support NR IAB related control plane signaling (between the Donor gNB and IAB node) via LTE. The motivation for this is that if the NR link for some reason (e.g., radio link failure) would be lost it would be possible to perform critical NR IAB related signaling via the LTE link. Also, if there are several hops in the IAB network, sending CP traffic via the LTE leg may end up being faster than sending it via the multiple hops. The proposed approach was to tunnel IAB related F1-AP signaling messages via X2 signaling to the LTE eNB and embed them in an LTE RRC signaling towards the IAB node over LTE radio.

There are certain drawbacks to this approach. One drawback with this proposed approach is that it is not so straight forward to support F1-AP signaling messages via LTE as suggested in the contributions above, since currently the F1-AP signaling protocol relies on functionality provided by its lower layers such as SCTP and IP, which is now proposed to be handled instead by LTE RRC and X2-AP. For instance The IP layer provides addressing information making it possible to setup multiple F1-AP connections (e.g., in case the JAB node supports multiple DU instances).

The SCTP layer provides reliable in-order delivery of F1-AP messages, which the F1-AP protocol expects from lower layer.

SCTP also has additional functionality such as keep alive signaling, multi-homing, etc., which higher layer may require.

Not using SCTP on the LTE leg makes it difficult to guarantee loss-less, duplication free in-order delivery of F1-AP message which has already been sent down to the SCTP layer used over the NR radio link but has not yet been delivered end to end (e.g., at the time the NR radio link is lost).

SUMMARY

Certain aspects of the present disclosure and their embodiments may provide solutions to these or other challenges. The present disclosure introduces a mechanism for the New Radio (NR) Donor gNodeB (gNB) to exchange F1-Application Protocol (F1-AP) signaling with the Integrated Access and Wireless Access Backhaul (JAB) node over the Long Term Evolution (LTE) radio using a solution where the whole Stream Control Transmission Protocol/Internet Protocol (SCTP/IP) packets are delivered between the NR Donor gNB and JAB node.

According to certain embodiments, a method by a first network node in an JAB network is provided. The method includes, in the absence of an NR link between the first network node and a second network in the JAB network, sending, to the second network node over Long Term Evolution, LTE, radio, one or more SCTP/IP packets. The one or more SCTP/IP packets includes F1-Application Protocol (F1-AP) signaling.

According to certain embodiments, a first network node includes processing circuitry configured to, in the absence of an NR link between the first network node and a second network in the IAB network, send, to the second network node over Long Term Evolution, LTE, radio, one or more SCTP/IP packets. The one or more SCTP/IP packets includes F1-Application Protocol (F1-AP) signaling.

Certain embodiments may provide one or more of the following technical advantages. As one example, a technical advantage may be that certain embodiments may support reliable delivery of NR IAB-related signaling between the Donor gNB and IAB node via LTE radio, which can, for instance, be used when the NR radio link is experiencing problems or is lost. In certain embodiments, the approach described herein does this by transferring full (or whole) SCTP/IP packets (or Internet Protocol Packet Data Units (IP PDUs)) over the LTE radio and between the LTE eNB and NR Donor gNB. By delivering whole SCTP/IP packets it is advantageously possible to still use the features provided by SCTP/IP, such as:

End to end SCTP guaranteed delivery, which advantageously avoids the need to support/specify LTE mechanism to handle the reliable delivery;

SCTP multi-homing, ensuring seamless/loss-less switch to LTE when the NR link is lost;

Other SCTP functions such as duplication removal, Quality of Service (QoS) streams, in order delivery, etc.; and An IP-addressing mechanism allowing multiple SCTP connections.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
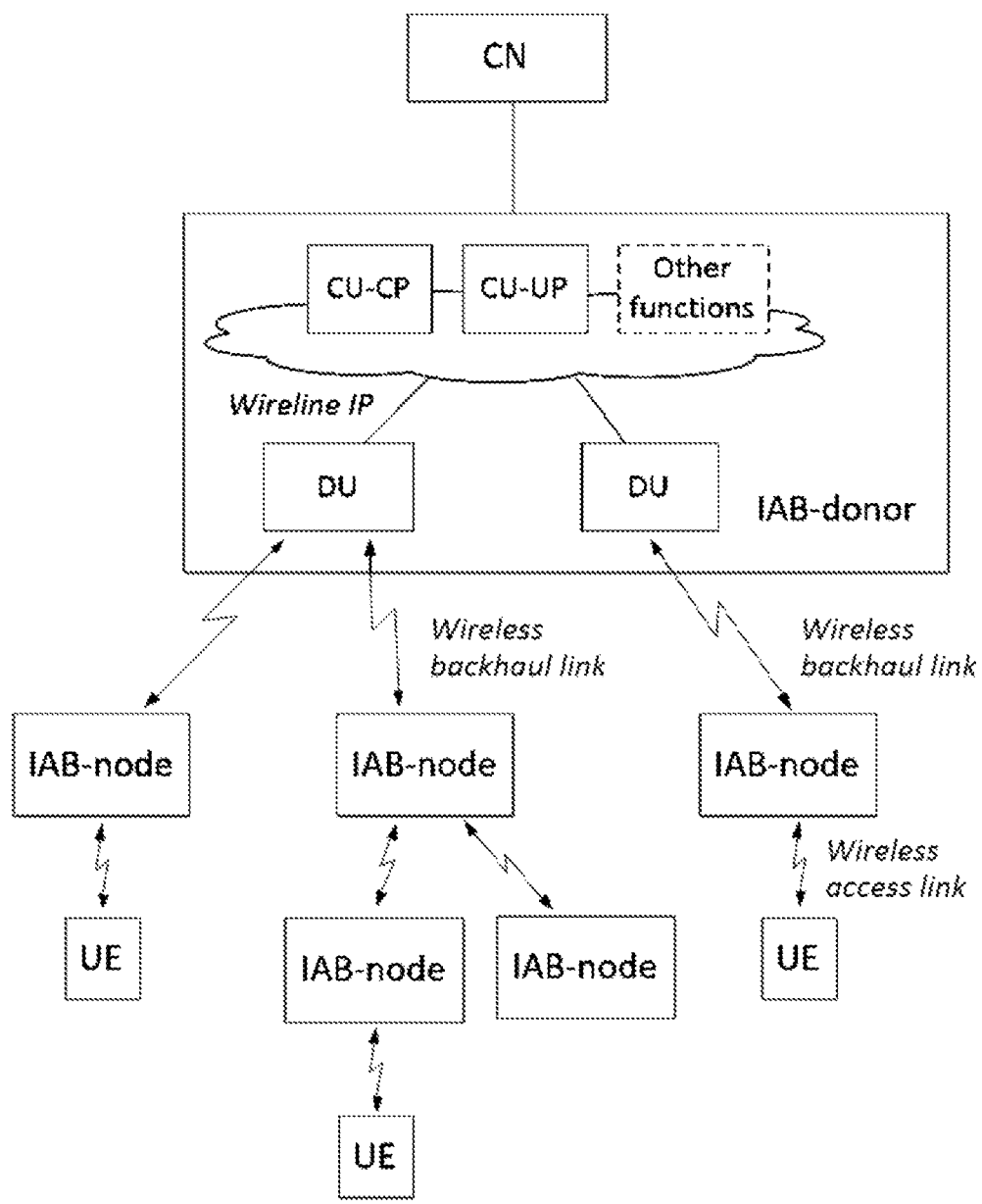
FIG. 1 illustrates a high-level architectural view of an integrated access and wireless access backhaul (IAB) network.
Figure 2:
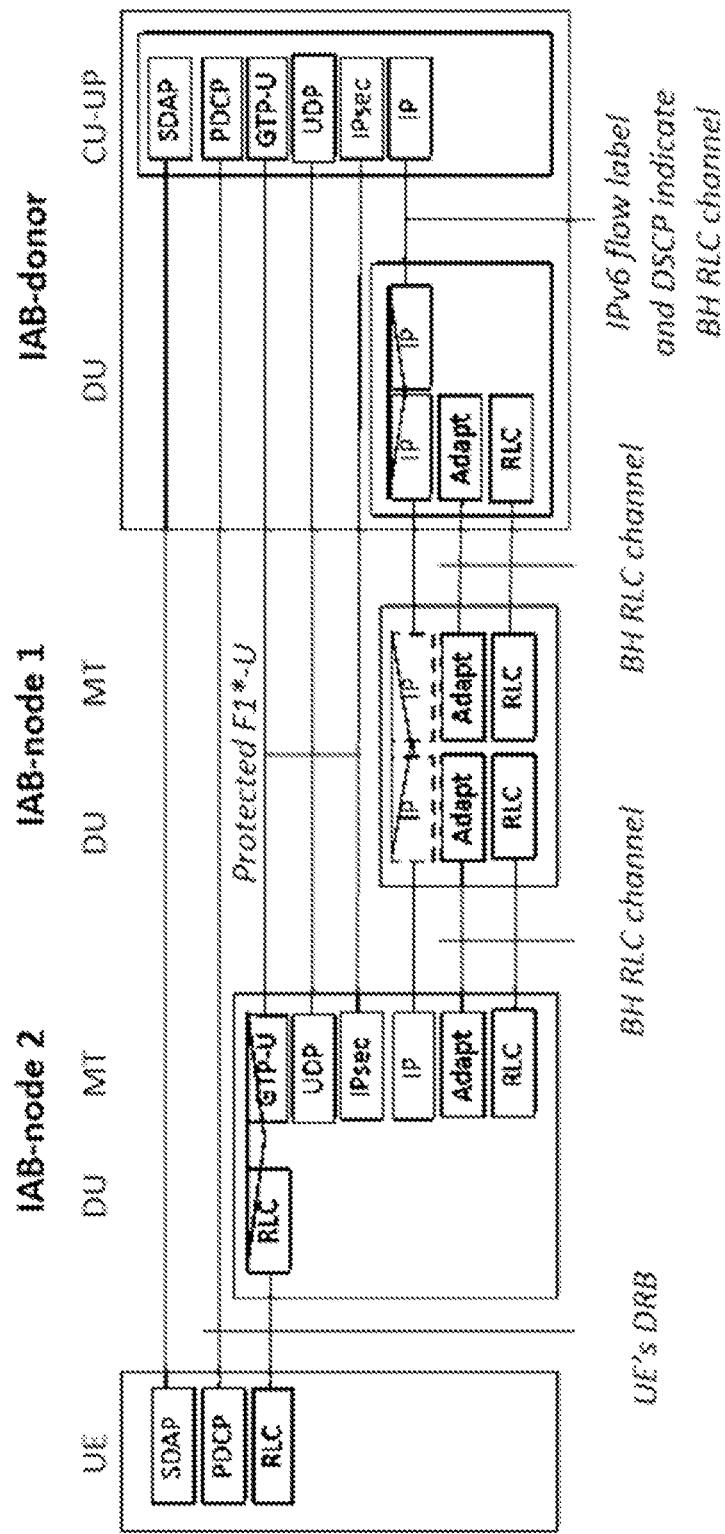
FIG. 2 illustrates the baseline user protocol stack for IAB in Rel-16.
Figure 3A:
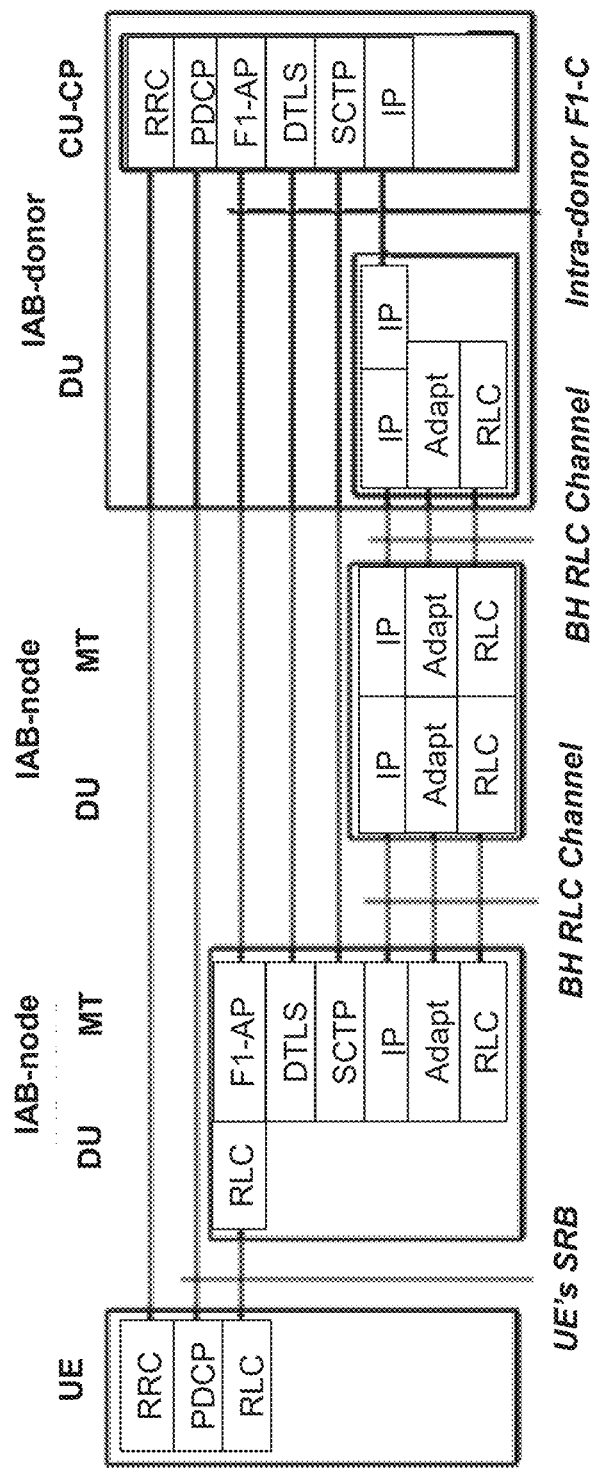
FIGS. 3A-3C illustrate the baseline control plane protocol stacks for IAB in Rel-16.
Figure 3B:
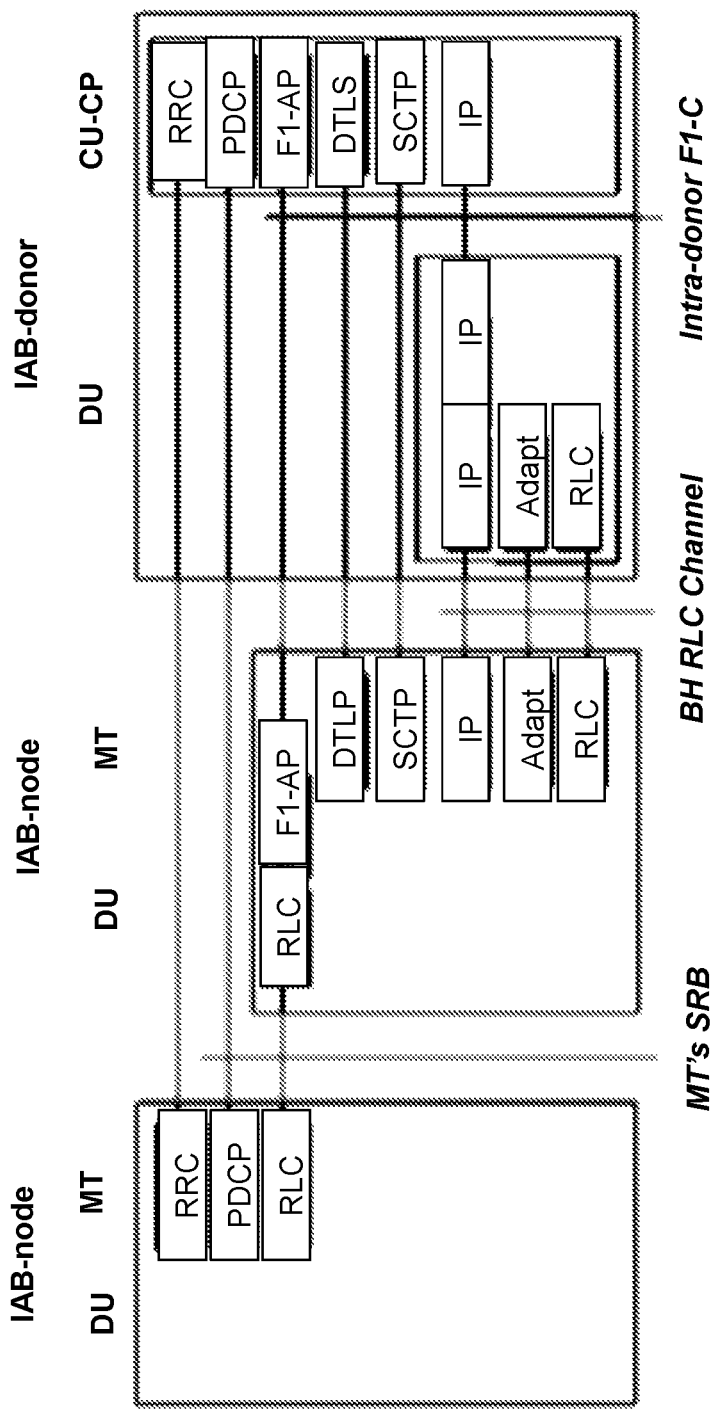
Figure 3C:
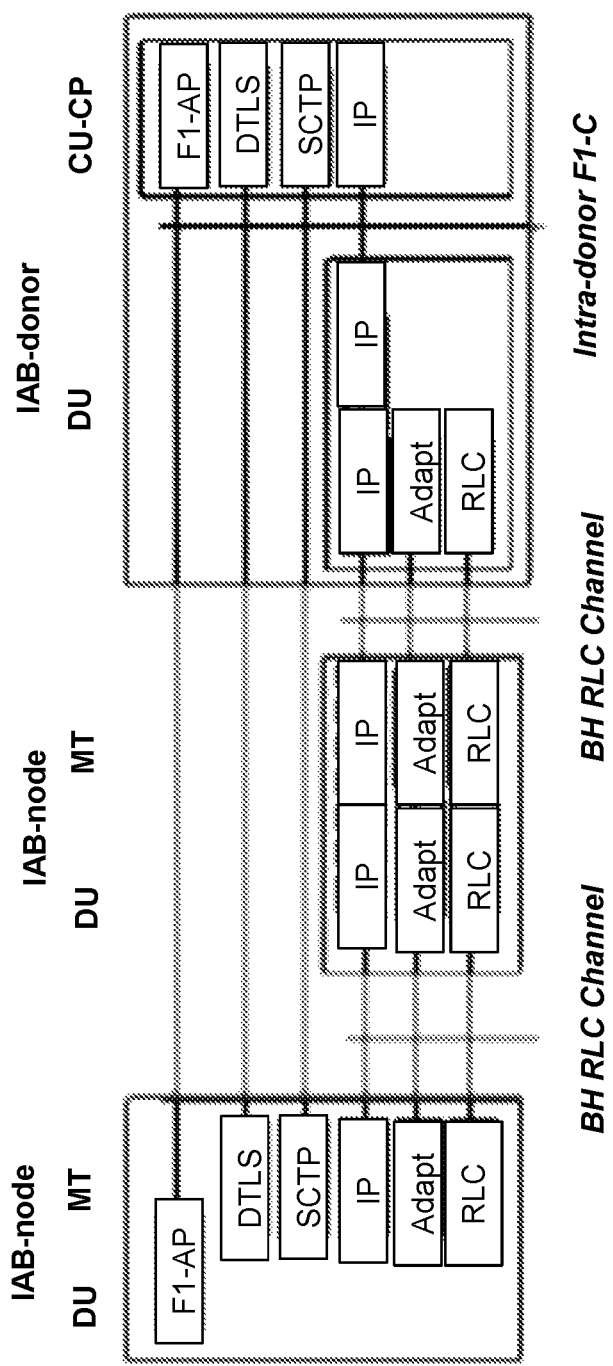
Figure 4:
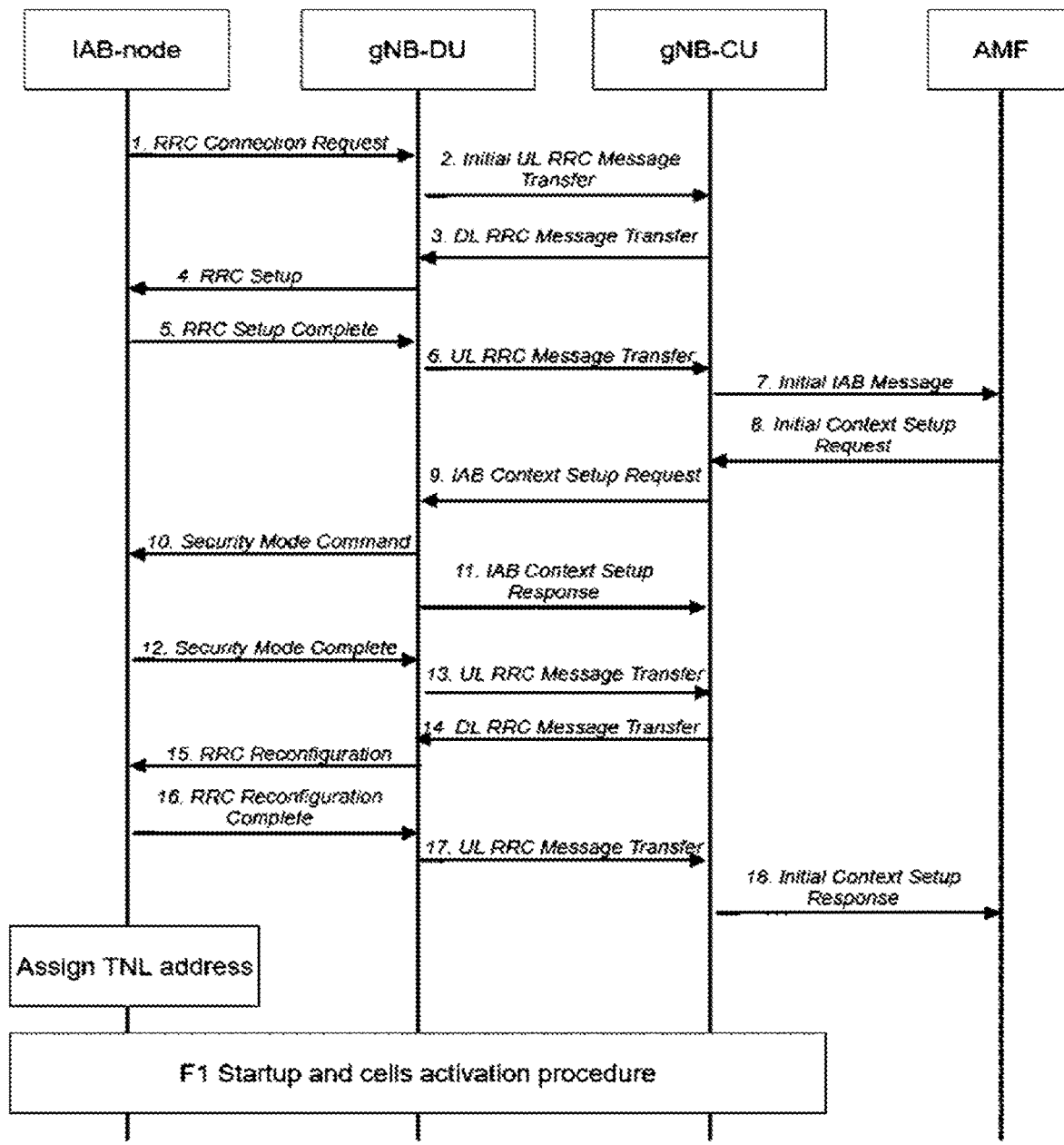
FIG. 4 illustrates an example IAB node integration procedure.
Figure 5:
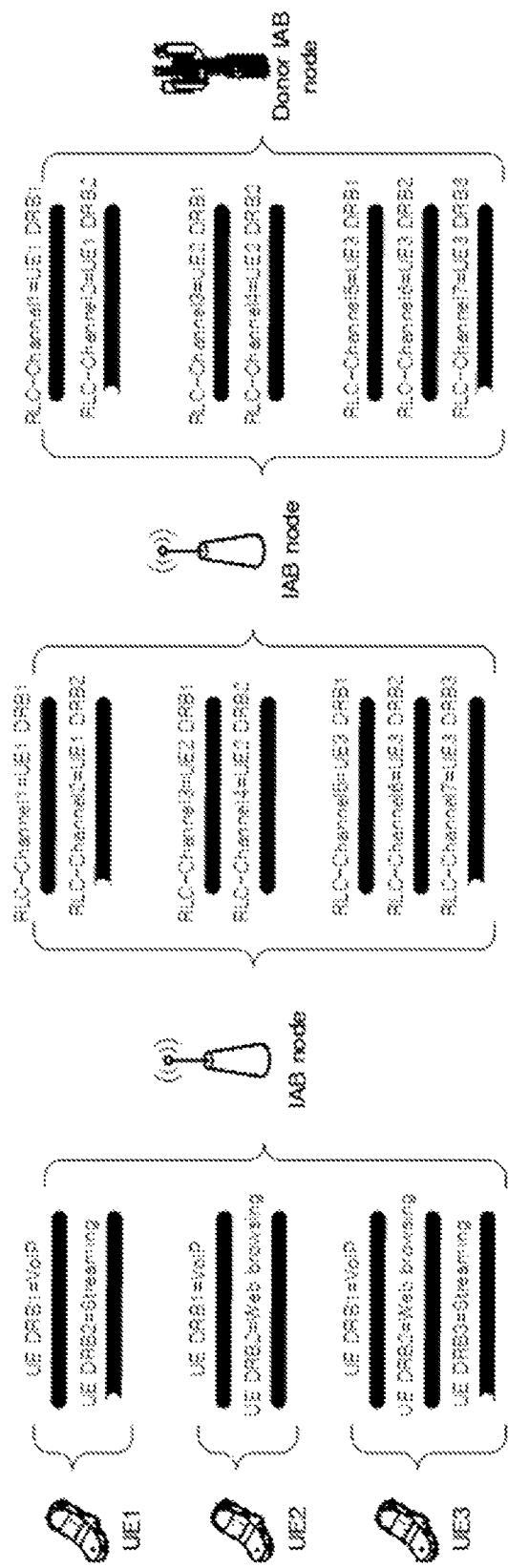
FIG. 5 illustrates an example of one-to-one mapping between User Equipment Data Radio Bearer (UE DRB) and Back Haul Radio Link Control-channel (BH RLC-channel)
Figure 6:
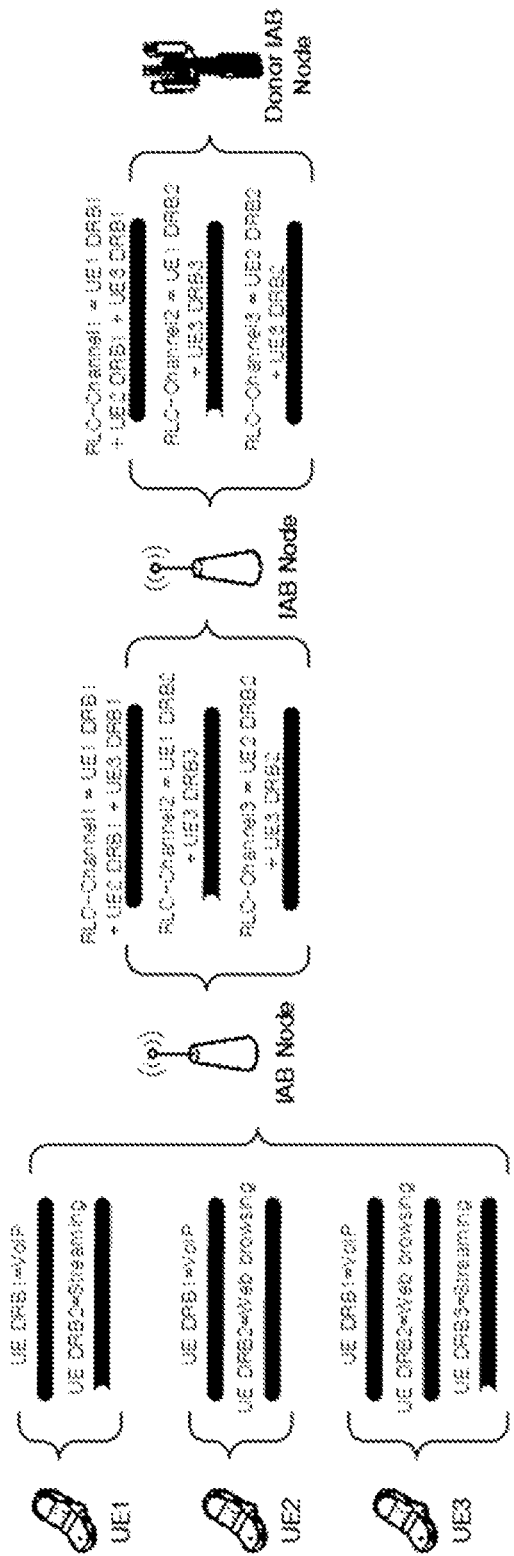
FIG. 6 illustrates an example of many-to-one mapping between UE DRBs and BH RLC-channel.
Figure 7:
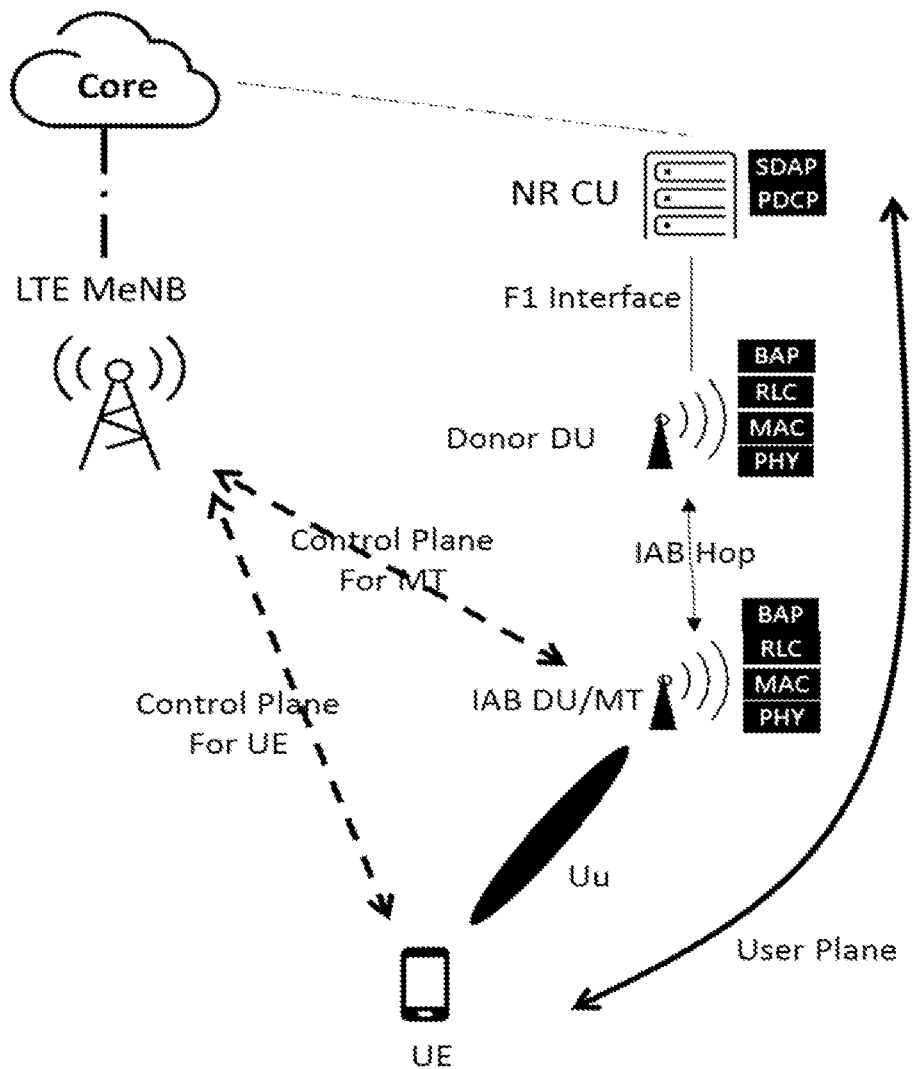
FIG. 7 illustrates an example of IAB deployment in EN-DC mode.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to certain embodiments, methods, systems, and techniques are disclosed for the NR Donor gNB to exchange F1-AP signaling with the IAB node over the LTE radio using a solution where the whole SCTP/IP packets are delivered between the NR Donor gNB and IAB node. This approach can be used to deliver F1-AP signaling even when the NR link has been lost. By delivering the whole SCTP/IP packets, it is possible to still use the features provided by the SCTP/IP, such as:

End to end SCTP guaranteed delivery, avoiding the need to support/specify LTE mechanism to handle the reliable delivery.

SCTP multi-homing, ensuring seamless/loss-less switch to LTE when the NR link is lost Other SCTP functions such as duplication removal, QoS streams, in order delivery, . . .

IP addressing mechanism allowing multiple SCTP connections

Several mechanisms for delivering whole SCTP/IP packets (or IP PDUs) are considered and described in detail below, including:

Mechanisms for sending the IP PDUs via X2-AP and RRC signaling (i.e., embedded the IP PDUs in X2/RRC signaling messages) over LTE radio.

Mechanisms for the IAB node to setup a separated Packet Data Network (PDN) connection from the IAB node to the 4G EPC core over LTE radio. This PDN connection could be associated with an IP address belonging to the operator's own internal IP network. The IAB node can then use this PDN connection/IP address to setup an F1-AP/SCTP signaling connection to the Donor gNB.

Mechanisms for the network to set up a special RLC-bearer or radio bearer (DRB) in the LTE eNB towards the IAB node over LTE radio. This special bearer can then be used for IP-based traffic between the IAB node and Donor gNB over LTE radio. On the hop between the LTE eNB and Donor gNB, it would be possible to setup a GTP tunnel associated with the bearer making it possible for the LTE eNB to map IP PDUs between the bearer over the radio and the GTP tunnel to/from the Donor gNB.

According to certain embodiments, a mechanism is disclosed that makes it possible to exchange signaling between an IAB node and its donor gNB via LTE based using full IP packets. Certain embodiments may include one or more of:

Sending the IP PDUs via X2-AP and RRC signaling (i.e., embedded the IP PDUs in X2/RRC signaling messages) over LTE radio.

Setting up a separated PDN connection from the IAB node to the 4G EPC core over LTE radio. This PDN connection could be associated with an IP address belonging to the operator's own internal IP network. The IAB node can then use this PDN connection/IP address to setup an F1-AP/SCTP signaling connection to the Donor gNB.

Setting up a special RLC-bearer or radio bearer (DRB) in the LTE eNB towards the IAB node over LTE radio. This special bearer can then be used for IP-based traffic between the IAB node and Donor gNB over LTE radio. On the hop between the LTE eNB and Donor gNB it would be possible to setup an GTP tunnel associated with the bearer making it possible for the LTE eNB to map IP PDUs between the bearer over the radio and the GTP tunnel to/from the Donor gNB.

In addition, according to certain embodiments, mechanisms are introduced to handle IP assignments, setup of SCTP and/or F1 connection, and handling of nodes with different capabilities.

According to certain embodiments, a method performed by a network node is disclosed. The method comprises sending, to another network node over LTE radio, one or more SCTP/IP packets.

According to particular embodiments, the one or more SCTP/IP packets may comprise one or more whole SCTP/IP packets. In a particular embodiment, the one or more SCTP/IP packets may comprise IAB control plane signaling. In a particular embodiment, the one or more SCTP/IP packets may comprise F1-AP signaling.

In a particular embodiment, the one or more SCTP/IP packets may be sent in the absence of an NR link.

In a particular embodiments, the network node may be one of an NR Donor gNB and an IAB node. In a particular embodiments, the another network node may be one of an NR Donor gNB and an IAB node.

According to certain embodiments, the method may further comprise obtaining an IP address allocated for use when communicating via LTE. In a particular embodiment, the IP address may be obtained using NAS signalling.

In a particular embodiment, the IP address may be allocated by an OAM system. In a particular embodiment, obtaining the IP address may include: sending a message to the OAM system and receiving, in response to the message, configuration information indicating the allocated IP address. In a particular embodiment, the IP address may be allocated using Internet Engineering Task Force (IETF) specified methods comprising one or more of DHCP and Ipv6 host discovery. In a particular embodiment, the IP address may be obtained in an RRC message from an LTE eNB. In a particular embodiment, obtaining the IP address may include implicitly assigning the IP address using an IP address received in a DL packet. In a particular embodiment, the one or more SCTP/IP packets may include the allocated IP address.

According to certain embodiments, the method may comprise setting up an SCTP connection to the another network node. In a particular embodiment, setting up the SCTP connection to the another network node may be performed in response to an indication from the another network node that a secondary SCTP connection is required. In a particular embodiment, setting up the SCTP connection to the another network node may be performed in response to a radio link failure.

According to certain embodiments, the method may comprise sending capability information to one or more of the another node and an LTE node. In a particular embodiment, the method may comprise receiving capability information from one or more of the another node and the LTE node.

According to certain embodiments, the method may comprise encrypting the one or more one or more SCTP/IP packets. In a particular embodiment, the one or more SCTP/IP packets may be encrypted using IPsec.

In a particular embodiment, the one or more SCTP/IP packets may be sent via X2-AP and RRC signaling over LTE radio. In certain embodiments, the one or more SCTP/IP packets may be embedded in X2/RRC signaling messages. In a particular embodiment, the method may comprise: generating an F1-AP message; putting the F1-AP message into an SCTP packet; putting the SCTP packet in an IP PDU; putting the IP PDU in an RRC message; and sending the RRC message to an LTE node. In a particular embodiment, the RRC message may be an UL transfer message.

In a particular embodiment, the one or more SCTP/IP packets may be sent via a separate PDN connection with a core network. In a particular embodiment, the method may comprise establishing the separate PDN connection with the core network using one or more NAS protocols.

In a particular embodiment, the one or more SCTP/IP packets may be sent via one of an RLC-bearer and a radio bearer in an LTE eNB. In a particular embodiment, the one or more SCTP/IP packets may be sent via a GTP tunnel associated with the one of the RLC-bearer and the radio bearer.

In a particular embodiment, the method may comprise: obtaining user data; and forwarding the user data to a host computer or a wireless device.

In a particular embodiment, whole IP packets (including higher layers such as SCTP) are carried over the LTE radio between the IAB node and Donor gNB. To achieve this, one or more of the following aspects could be supported.

IP Address Allocation

It is possible to allocate one or more separate IP address (es) for the IAB node to be used when communicating via LTE. When the Donor gNB wants to send an IP packet(s) to the IAB node it would send the packets using one of the IAB addresses allocated for this purpose. The packet will then be routed via LTE. Similarly, when the IAB node wants to send an IP packet via LTE it would include the allocated IP address (the IAB address).

Several mechanism may be used to allocate the IP address (es), including (but not limited to) those described below:

It could be allocated using NAS signaling (e.g., when the IAB node registers or attaches to the LTE network). An advantage of this approach is that functionality in the network could be reused.

It could be allocated by the OAM system serving the IAB node. For example, when the IAB nodes power on they may contact the OAM system and could in response receive configuration information. An advantage of this approach is that this functionality would only impact the OAM system and associated interfaces.

It could be allocated using IETF specified methods such as DHCP, or IPv6 host discovery. In this case, a "logical channel" or L2 connection could be established in LTE which the IAB node uses to perform DHCP or IPv6 signaling. An advantage of this approach is that functionality in the network could be reused. This approach may also advantageously avoid core network impacts, reducing network costs/complexity.

It could be explicitly assigned by the RRC layer (e.g., in an RRC message from the LTE eNB to the IAB node). An advantage of this approach is that it could also avoid core network impacts, reducing network costs/complexity.

It could be implicitly assigned by the IAB using the same IP address as it receives in an DL packet. An advantage of this approach is that functionality in the network could be reused.

As described above, the different approaches above have various pros and cons with regards to standard impacts, complexity and performance. Other pros and cons than mentioned above can also be considered.

SCTP Setup and F1 Connection Setup/Association

When the IAB node has been allocated one or more IP address(es) for sending IP packets via LTE, the IAB node can setup a SCTP connection to the Donor gNB (or Donor gNB-CU-CP function to be more exact). One possible approach is that this could be triggered by the Donor gNB sending an indication to the IAB node that a secondary SCTP connection (through LTE) is required. Another possible approach is that it could be triggered by the IAB losing the NR link (e.g., due to radio link failure). In certain embodiments, the SCTP connection via LTE can either be used immediately after setup to perform F1-AP signaling or, alternatively, the IAB signaling will start at a later stage (e.g., when the NR link is starting to experience problems).

Capability-Related Aspects

Not all IAB nodes and/or Donor gNB and/or LTE nodes may support the feature of exchanging F1 signaling via LTE as described herein. In order to support scenarios in which not all nodes support this feature, it is possible to exchange capability information between the involved nodes, making it possible to only use the feature when it is support by all or a sub set of the nodes. Examples of how this can be achieved include (but are not limited to) those described below. These examples can be used in combination or separately:

- The IAB node could indicate to the Donor gNB (e.g., Donor gNB-CU-CP) and/or LTE eNB that it supports the feature or that it supports it and wants to use it. The indication could be sent in an RRC or F1-AP message to Donor gNB. It could alternatively be included as a parameter in the UE radio access capabilities.
- The Donor gNB could indicate to the IAB node that it supports the feature or that it supports it and wants to use it. The indication could be sent in an RRC or F1-AP message to IAB node. It could alternatively be included in a broadcast message (e.g., as part of system information broadcast).
- The LTE eNB could indicate to the IAB node that it supports the feature or that it supports it and wants to use it. The indication could be sent in an RRC to IAB node. It could alternatively be included in a broadcast message (e.g., as part of system information broadcast).
- The LTE eNB could indicate to the Donor gNB that it supports the feature or that it supports it and wants to use it. The indication could be sent in an Xn or X2 message.
- The Donor gNB could indicate to the LTE eNB that it supports the feature or that it supports it and wants to use it. The indication could be sent in an Xn or X2 message.

Using any one or more of the methods above, it would be possible for one node to know if the feature is supported in other nodes and only invoke feature related procedure in case it is supported on both sides.

The Usage of IP Security (IP Sec)

According to certain embodiments, the IP packets may be protected by IPsec operating, for example, in either tunnel mode or transport mode. In this case, the transmitting entity will encrypt the packet according to IPsec principle(s) and the receive node will decrypt the packet.

Sending the F1 AP Signaling in IP PDUs Via X2-AP and RRC Signaling (i.e., Embedded the IP PDUs in X2/RRC Signaling Messages) Over LTE Radio.

According to certain embodiments, the F1-AP signaling may be sent in IP PDUs via X2-AP and RRC signaling (i.e., embedded the IP PDUs in X2/RRC signaling messages) over LTE radio. This approach is based on sending the F1-AP signaling messages inside SCTP packets inside IP packets inside X2 and RRC messages.

Below are some example procedures for IAB node sending an F1-AP message to the Donor gNB and vice versa.

IAB Node=>Donor gNB:

The procedure starts by the IAB node generating an F1-AP message. The message may be put inside an SCTP packet. The SCTP packet is put in an IP which is addressed towards the Donor DU. The IP PDU is then put inside an RRC message. In principle, any RRC message could be considered (e.g., the RRC UL transfer message). The actual ASN.1 coding used to transfer the IP PDU could use the OCTET STRING type as shown below, which is transparent to the RRC protocol machine (e.g., the RRC protocol machine will just past the content to higher layer):

```
-- ASN1START
TunneledIAB-Packet ::=          OCTET STRING
-- ASN1STOP
```

The RRC message is then sent to the LTE eNB on one of the signaling radio bearers. When the LTE eNB receives the message, it will transparently forward the IP PDU to the NR gNB over X2 interface. The LTE eNB would know which node to forward the content to based on know which Secondary NR node the IAB node is connected. The IP PDU can be sent inside any X2 message such as X2-AP RRC TRANSFER or X2-AP SgNB Reconfiguration Completion. Again, the coding of the IP PDU could be to use the OCTET STRING type.

When the gNB receives the IP PDU, it can send it to its own IP stack. From this step, the IP/SCTP/F1-AP packet could be decoded as the normal case when sending F1-AP over NR radio link.

Donor gNB=>IAB Node:

The procedure is similar to the procedure described above with the exception that the Donor gNB generates the F1-AP/SCTP/IP packets and then puts inside an X2-AP message and sends it to the LTE eNB for delivery to the IAB node. The LTE eNB puts the IP PDU into an RRC message. When the IAB node receives the RRC message it unpacks the PDU and sends it to the IP stack UE.

Sending the F1-AP Signaling in IP PDUs Via a Separate PDN Connection.

According to certain embodiments, the F1-AP signaling may be sent in IP PDUs via a separate PDN connection. This approach is based on that the IAB node setups up a PDN connection to the 4G or EPC core network. The signaling procedure to setup the connection used by IAB node could be based on signaling for UEs setting PDN connection (e.g., reusing the NAS protocols procedures). The following enhancements to the procedure for this case could be considered:

- The IAB node can provide an indication that it is an IAB node in one of the messages to the core network. This could be used by the core network to select a Packet Gateway (GW) which is responsible for supporting IP services between the RAN (e.g., Donor gNB) and IAB node.
- The subscription information stored in a home subscription register in the core network could include an indication that the IAB node is an IAB node, again making it possible for the core network (e.g., MME) to select the right packet GW (e.g., PDN GW).
- The CN could also provide an indication to a charging system or similar network element to enable different charging policies for IAB node signaling compared to normal end users.

Once the separate PDN connection is established, the IAB node can use this connection to communicate with the Donor gNB. For example, it could setup SCTP/F1 connections and exchange F1-AP signaling messages. The IP address to be used for this connection could be allocated as part of the PDN connection setup signaling.

Sending the F1-AP Signaling in IP PDUs Via a Special RLC Bearer

According to certain embodiments, the F1-AP signaling may be sent in IP PDUs via a special RLC bearer. In this approach the network sets up a special RLC-bearer or data radio bearer in the LTE eNB towards the IAB node over LTE radio. This special bearer can then be used for IP based traffic between the IAB node and Donor gNB over LTE radio. The triggering to setup the bearer could be done in the LTE eNB (e.g., as a response to the IAB node connecting to the network). The bearer setup signaling can reuse parts of DRB signaling towards the IAB node. This bearer could, however, be different from a normal DRB in that it may not be required to setup Packet Data Convergence Protocol (PDCP) layers in the IAB node (e.g., only the RLC-bearer part is needed since the security protection of F1-AP signaling can be provided by the IP layer using, for example, IPsec, which is how F1 signaling is protected when using the NR link).

On the hop between the LTE eNB and Donor gNB it would be possible to setup an GTP tunnel associated with the bearer making it possible for the LTE eNB to map IP PDUs between the bearer over the radio and the GTP tunnel to/from the Donor gNB. In this case, when the Donor gNB wants to send an F1-AP/SCTP/IP PDU to the IAB node over LTE radio it can send the packet inside a GTP/UDP/IP packet to the LTE eNB. The Donor gNB could send the packet using a Tunnel Endpoint ID (TEID) associated with the special bearer. In a particular embodiment, this GTP TEID will be allocated by the LTE eNB and then signaled to the Donor gNB using X2 signaling. In a particular embodiment, a different GTP tunnel could be used for UL packets from the IAB node to the Donor gNB. In that case, the TEID could be allocated by the gNB and then sent to the LTE eNB in X2 signaling.

Over the radio interface the bearer can be associated with a logical channel identifier which separates the F1-AP signaling from other data or signaling sent to/from the IAB node.

Figure 8:
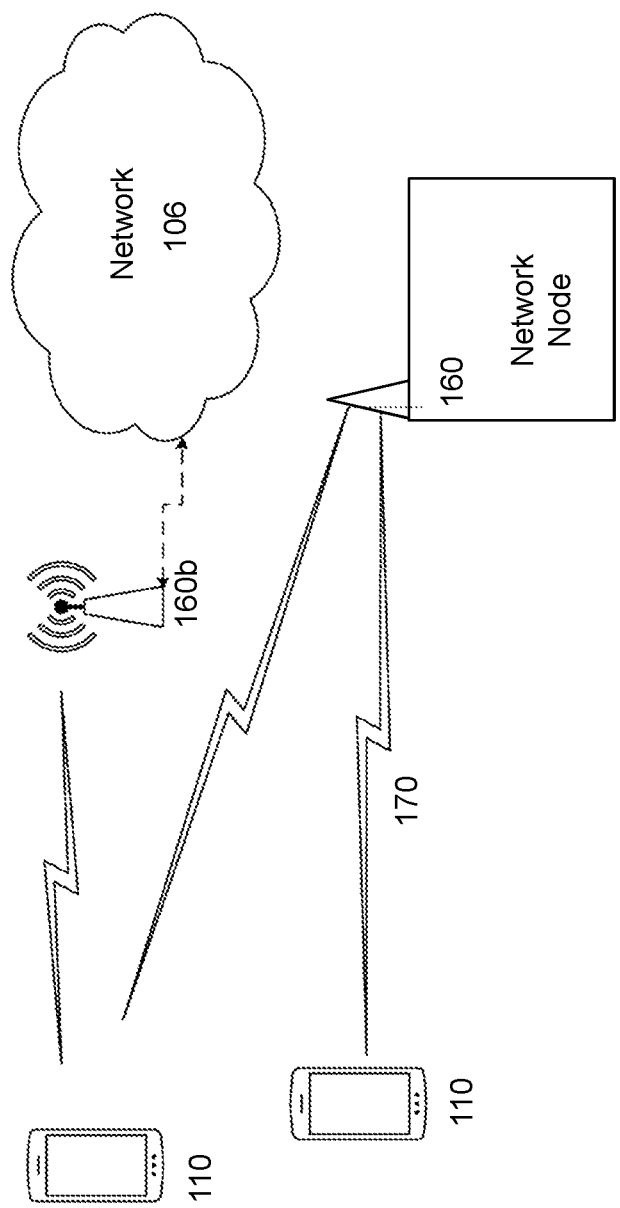
FIG. 8 illustrates an example wireless network, according to certain embodiments.

FIG. 8 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
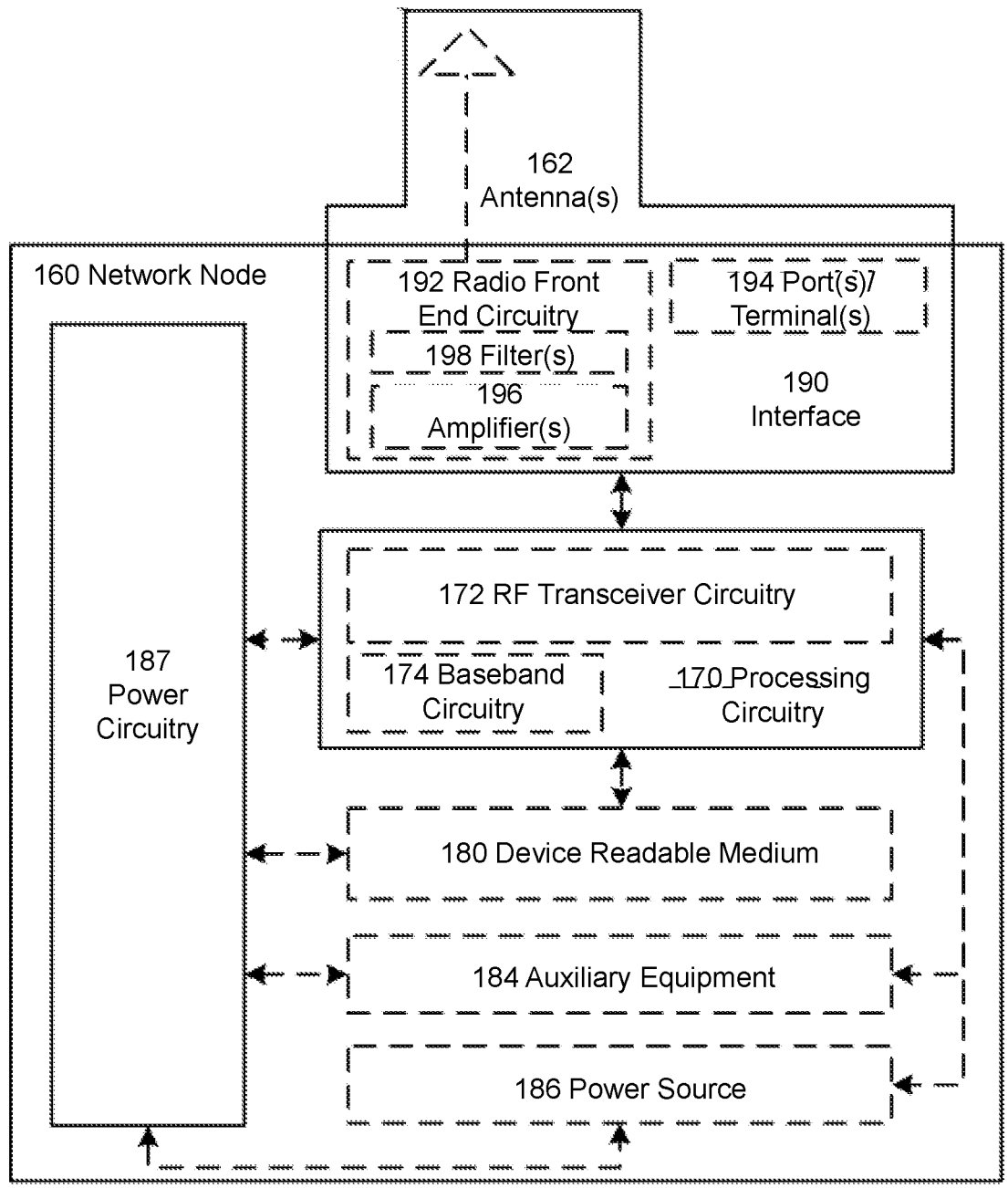
FIG. 9 illustrates an example network node, according to certain embodiments.

FIG. 9 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, IAB node, Donor gNB, LTE eNB, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
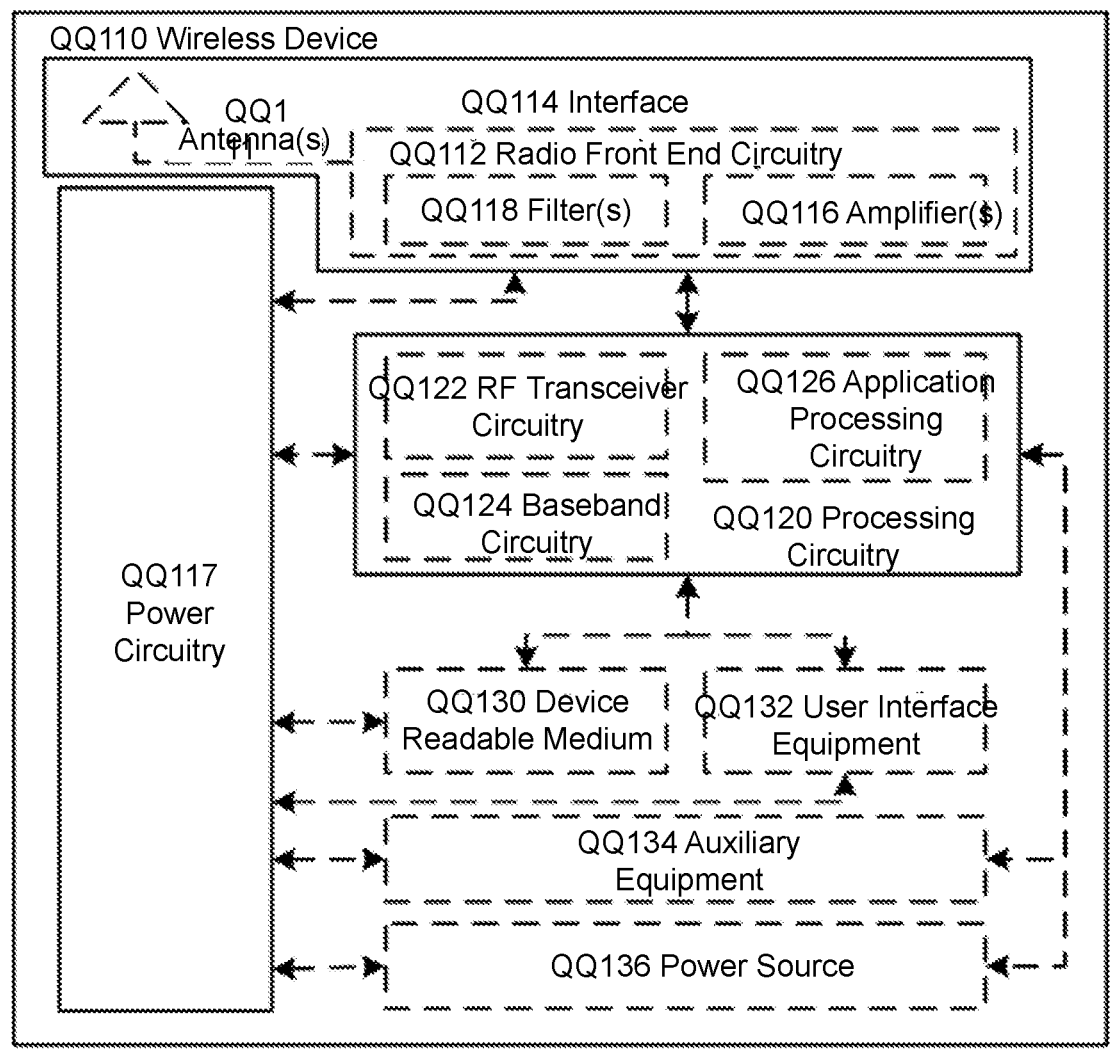
FIG. 10 illustrates an example wireless device, according to certain embodiments.

FIG. 10 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 11:
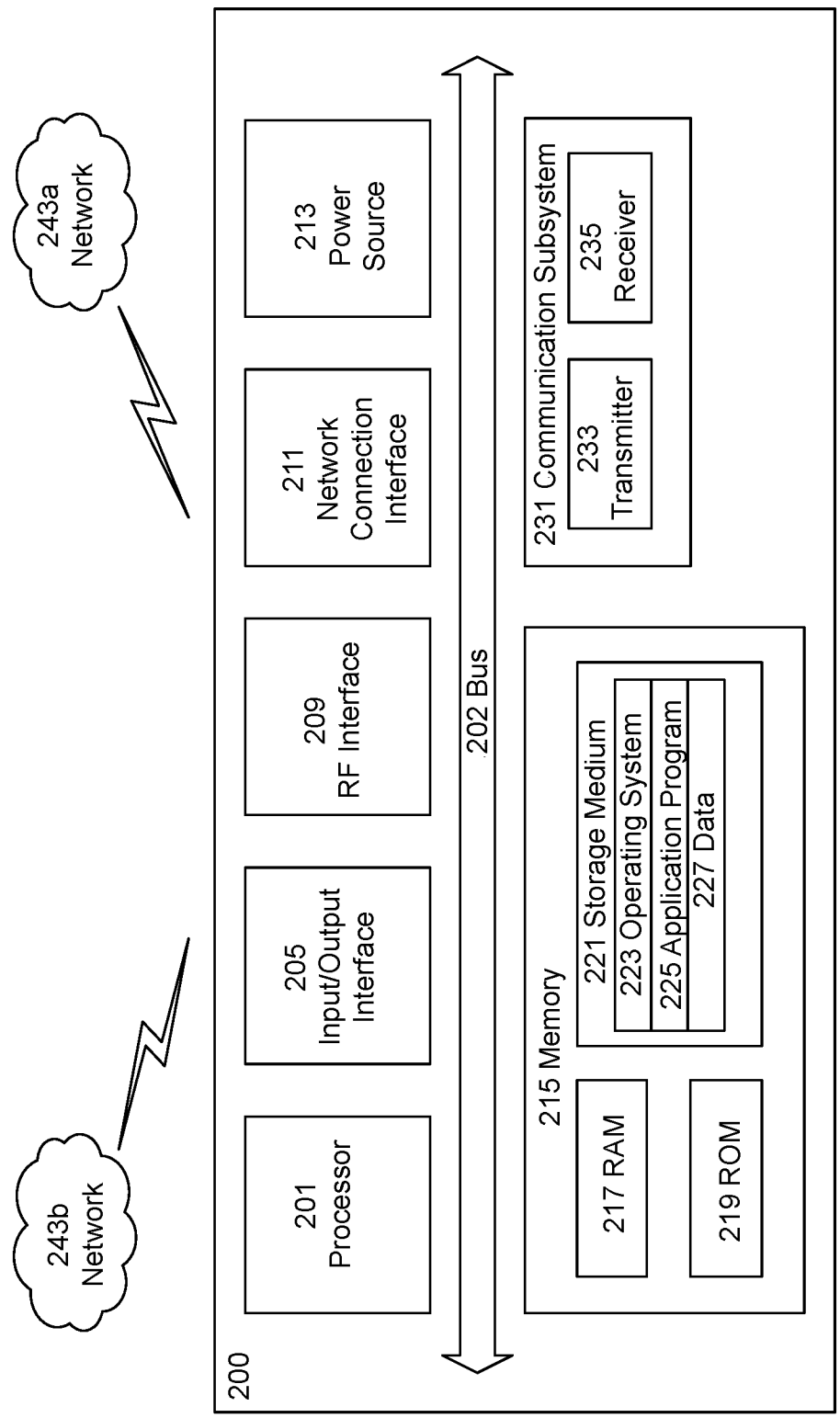
FIG. 11 illustrate an example user equipment, according to certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 11, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243$a$. Network 243$a$ may encompass wired and/or wireless networks such as a local-area network (LAN), a wide-area network (WAN), a computer network, a wireless network, a telecommunications network, another like network or any combination thereof. For example, network 243$a$ may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243$b$ using communication subsystem 231. Network 243$a$ and network 243$b$ may be the same network or networks or different network or networks. Communication subsystem 231 may be configured to include one or more transceivers used to communicate with network 243$b$. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243$b$ may encompass wired and/or wireless networks such as a local-area network (LAN), a wide-area network (WAN), a computer network, a wireless network, a telecommunications network, another like network or any combination thereof. For example, network 243$b$ may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
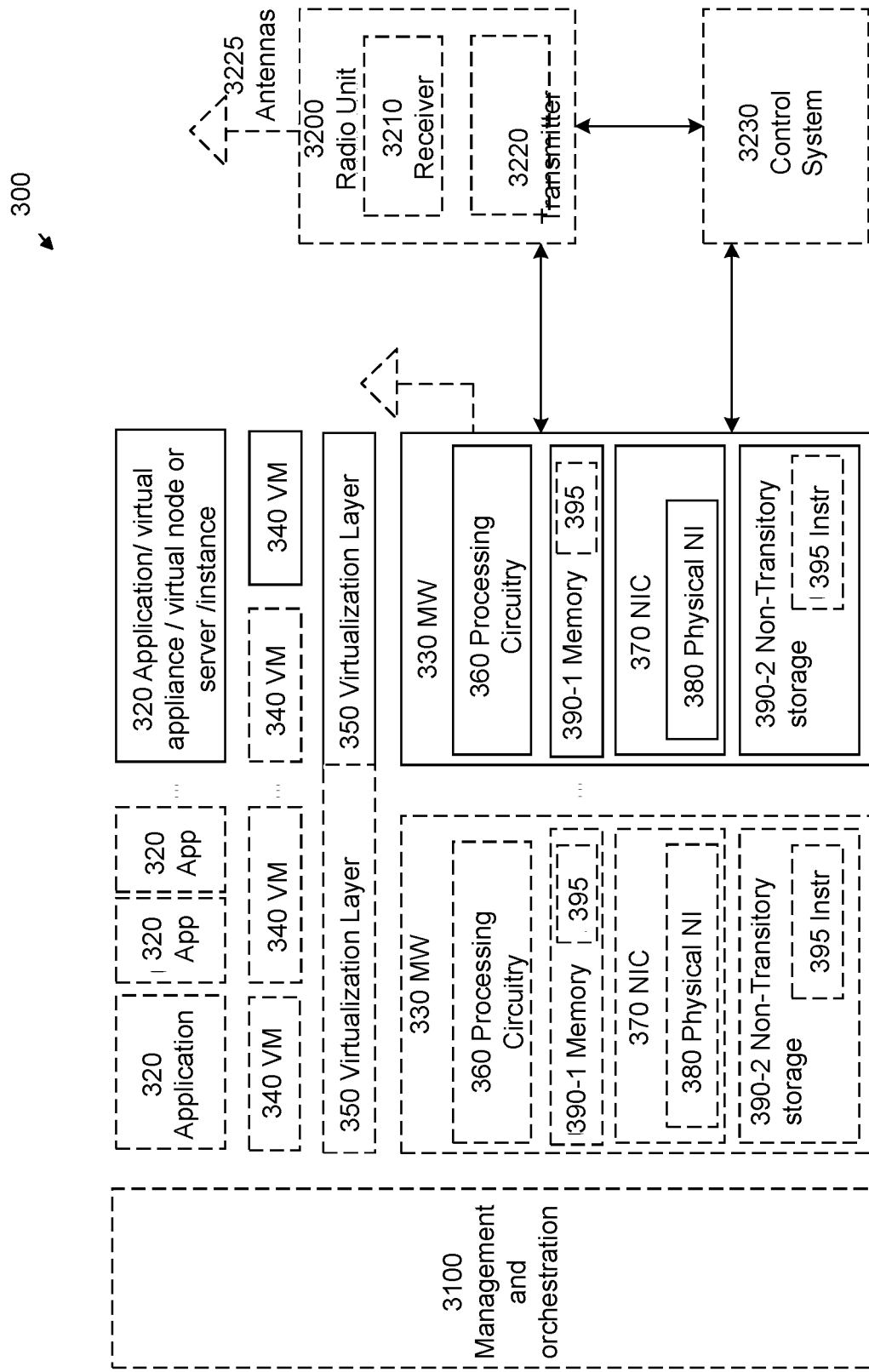
FIG. 12 illustrates a virtualization environment in which functions implemented by some embodiments may be virtualized, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 16:
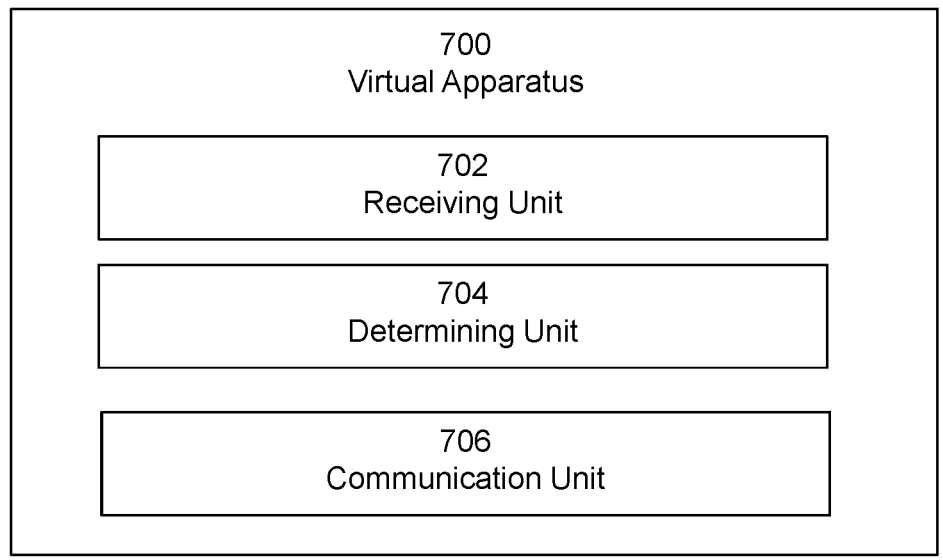
FIG. 16 illustrates another exemplary virtual computing device, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 16.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 13:
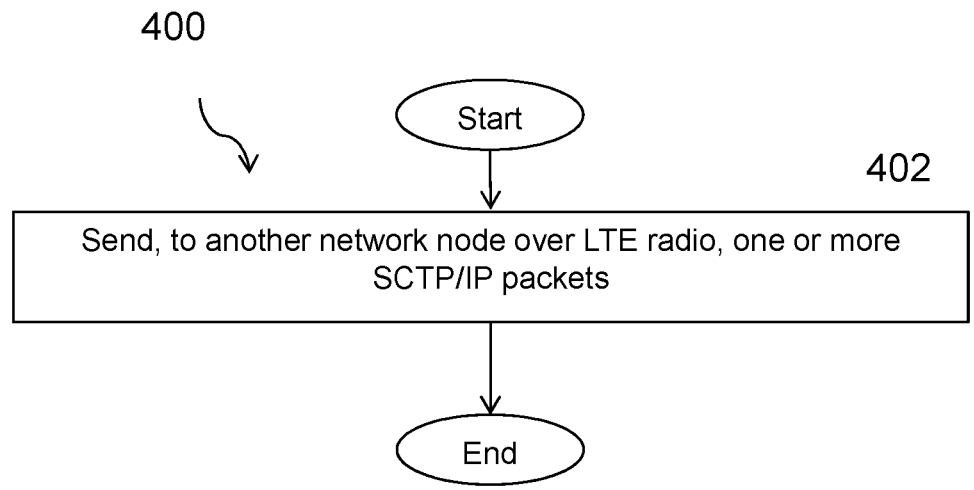
FIG. 13 illustrates an example method by a network node, according to certain embodiments.

FIG. 13 depicts a method 400 by a network node, according to certain embodiments. The method begins at step 402 with sending, to another network node over LTE radio, one or more SCTP/IP packets.

In certain embodiments, the one or more SCTP/IP packets may comprise one or more whole SCTP/IP packets. In certain embodiments, the one or more SCTP/IP packets may comprise IAB control plane signaling. In certain embodiments, the one or more SCTP/IP packets may comprise F1-AP signaling.

In certain embodiments, sending the one or more SCTP/IP packets may be performed in the absence of an NR link.

In certain embodiments, the network node may be one of an NR Donor gNB and an IAB node. In certain embodiments, the another network node may be one of an NR Donor gNB and an IAB node.

In certain embodiments, the method may further comprise obtaining an IP address allocated for use when communicating via LTE. In certain embodiments, the IP address may be obtained using NAS signalling.

In certain embodiments, the IP address may be allocated by an OAM system. In certain embodiments, obtaining the IP address may comprise: sending a message to the OAM system; and receiving, in response to the message, configuration information indicating the allocated IP address. In certain embodiments, the IP address may be allocated using IETF specified methods comprising one or more of DHCP and Ipv6 host discovery. In certain embodiments, the IP address may be obtained in an RRC message from an LTE eNB. In certain embodiments, obtaining the IP address may comprise implicitly assigning the IP address using an IP address received in a DL packet. In certain embodiments, the one or more SCTP/IP packets may include the allocated IP address.

In certain embodiments, the method may comprise setting up an SCTP connection to the another network node. In certain embodiments, setting up the SCTP connection to the another network node may be performed in response to an indication from the another network node that a secondary SCTP connection is required. In certain embodiments, setting up the SCTP connection to the another network node may be performed in response to a radio link failure.

In certain embodiments, the method may comprise sending capability information to one or more of the another node and an LTE node. In certain embodiments, the method may comprise receiving capability information from one or more of the another node and the LTE node.

In certain embodiments, the method may comprise encrypting the one or more one or more SCTP/IP packets. In certain embodiments, the one or more SCTP/IP packets may be encrypted using IPsec.

In certain embodiments, the one or more SCTP/IP packets may be sent via X2-AP and RRC signaling. In certain embodiments, the one or more SCTP/IP packets may be embedded in X2/RRC signaling messages. In certain embodiments, the method may comprise: generating an F1-AP message; putting the F1-AP message into an SCTP packet; putting the SCTP packet in an IP PDU; putting the IP PDU in an RRC message; and sending the RRC message to an LTE node. In certain embodiments, the RRC message may be an UL transfer message.

In certain embodiments, the one or more SCTP/IP packets may be sent via a separate PDN connection with a core network. In certain embodiments, the method may comprise establishing the separate PDN connection with the core network using one or more NAS protocols.

In certain embodiments, the one or more SCTP/IP packets may be sent via one of an RLC-bearer and a radio bearer in an LTE eNB. In certain embodiments, the one or more SCTP/IP packets may be sent via a GTP tunnel associated with the one of the RLC-bearer and the radio bearer.

In certain embodiments, the method may comprise: obtaining user data; and forwarding the user data to a host computer or a wireless device.

Figure 14:
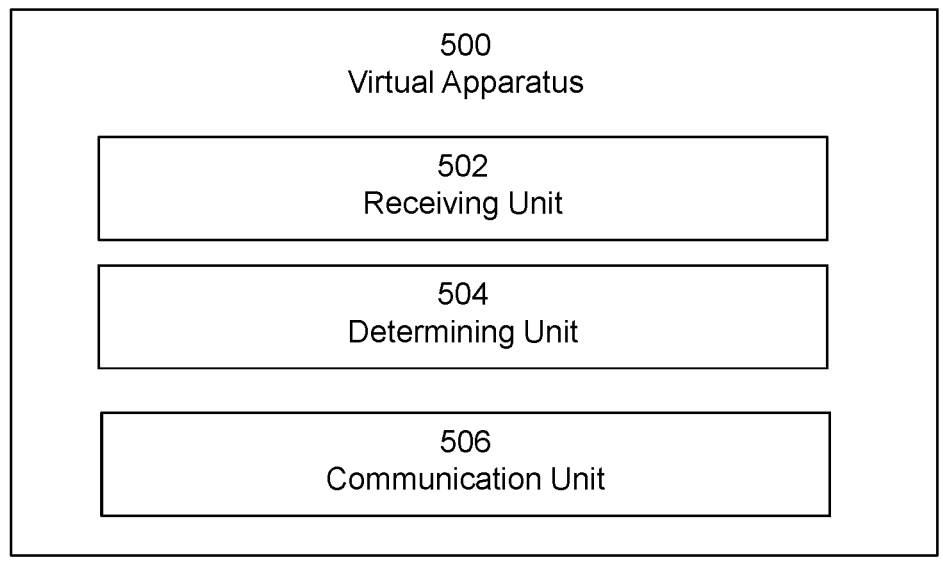
FIG. 14 illustrates another exemplary virtual computing device, according to certain embodiments.

FIG. 14 illustrates a schematic block diagram of an apparatus 500 in a wireless network (for example, the wireless network shown in FIG. 8). The apparatus may be implemented in a network node (e.g., network node 160 shown in FIG. 9). Apparatus 500 is operable to carry out the example method described with reference to FIG. 13 and possibly any other processes or methods disclosed herein. It is also to be understood that the method of FIG. 13 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 502, determining unit 504, communication unit 506, and any other suitable units of apparatus 500 to perform corresponding functions according one or more embodiments of the present disclosure.

In certain embodiments, apparatus 500 may be an IAB node or a Donor gNB. As illustrated in FIG. 14, apparatus 500 includes receiving unit 502, determining unit 504, and communication unit 506. Receiving unit 502 may be configured to perform the receiving functions of apparatus 500. For example, receiving unit 502 may be configured to obtain an IP address allocated for use when communicating via LTE. In certain embodiments, receiving unit 502 may be configured to receive, in response to the message, configuration information indicating the allocated IP address.

As another example, receiving unit 502 may be configured to receive capability information from one or more of another network node and the LTE node. As still another example, receiving unit 502 may be configured to obtain user data.

Receiving unit 502 may receive any suitable information (e.g., from a wireless device or another network node). Receiving unit 502 may include a receiver and/or a transceiver, such as RF transceiver circuitry 172 described above in relation to FIG. 9. Receiving unit 502 may include circuitry configured to receive messages and/or signals (wireless or wired). In particular embodiments, receiving unit 502 may communicate received messages and/or signals to determining unit 504 and/or any other suitable unit of apparatus 500. The functions of receiving unit 502 may, in certain embodiments, be performed in one or more distinct unit.

Determining unit 504 may perform the processing functions of apparatus 500. For example, determining unit 504 may be configured to obtain an IP address allocated for use when communicating via LTE. In certain embodiments, determining unit 504 may be configured to implicitly assign the IP address using an IP address received in a DL packet.

As another example, determining unit 504 may be configured to set up an SCTP connection to another network node. In certain embodiments, determining unit 504 may be configured to set up the SCTP connection to the another network node in response to an indication from the another network node that a secondary SCTP connection is required. In certain embodiments, determining unit 504 may be configured to set up the SCTP connection to the another network node in response to a radio link failure.

As another example, determining unit 504 may be configured to encrypt the one or more one or more SCTP/IP packets. In certain embodiments, determining unit 504 may be configured to encrypt the one or more SCTP/IP packets using IPsec.

As another example, determining unit 504 may be configured to generate an F1-AP message; put the F1-AP message into an SCTP packet; put the SCTP packet in an IP PDU; and put the IP PDU in an RRC message.

As still another example, determining unit 504 may be configured to establish a separate PDN connection with a core network using one or more NAS protocols.

As yet another example, determining unit 504 may be configured to obtain user data.

Determining unit 504 may include or be included in one or more processors, such as processing circuitry 170 described above in relation to FIG. 9. Determining unit 504 may include analog and/or digital circuitry configured to perform any of the functions of determining unit 504 and/or processing circuitry 170 described above. The functions of determining unit 504 may, in certain embodiments, be performed in one or more distinct units.

Communication unit 506 may be configured to perform the transmission functions of apparatus 500. For example, communication unit 506 may be configured to send, to another network node over LTE radio, one or more SCTP/IP packets. In certain embodiments, the one or more SCTP/IP packets may comprise one or more whole SCTP/IP packets. In certain embodiments, the one or more SCTP/IP packets may comprise IAB control plane signaling. In certain embodiments, the one or more SCTP/IP packets may comprise F1-AP signaling. In certain embodiments, communication unit 506 may be configured to send the one or more SCTP/IP packets in the absence of an NR link.

As another example, communication unit 506 may be configured to send a message to an OAM system (e.g., requesting an IP address for use when communicating via LTE). As still another example, communication unit 506 may be configured to send capability information to one or more of another network node and an LTE node.

As yet another example, communication unit 506 may be configured to send the one or more SCTP/IP packets via X2-AP and RRC signaling. In certain embodiments, the one or more SCTP/IP packets may be embedded in X2/RRC signaling messages. In certain embodiments, communication unit 506 may be configured to send an RRC message (e.g., an UL transfer message) to an LTE node.

As another example, communication unit 506 may be configured to send the one or more SCTP/IP packets via a separate PDN connection with a core network.

As another example, communication unit 506 may be configured to send the one or more SCTP/IP packets via one of an RLC-bearer and a radio bearer in an LTE eNB. In certain embodiments, communication unit 506 may be configured to send the one or more SCTP/IP packets via a GTP tunnel associated with the one of the RLC-bearer and the radio bearer.

As another example, communication unit 506 may be configured to forward user data to a host computer or a wireless device.

Communication unit 506 may transmit messages (e.g., to a wireless device and/or another network node). Communication unit 506 may include a transmitter and/or a transceiver, such as RF transceiver circuitry 172 described above in relation to FIG. 9. Communication unit 506 may include circuitry configured to transmit messages and/or signals (e.g., through wireless or wired means). In particular embodiments, communication unit 506 may receive messages and/or signals for transmission from determining unit 504 or any other unit of apparatus 500. The functions of communication unit 504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
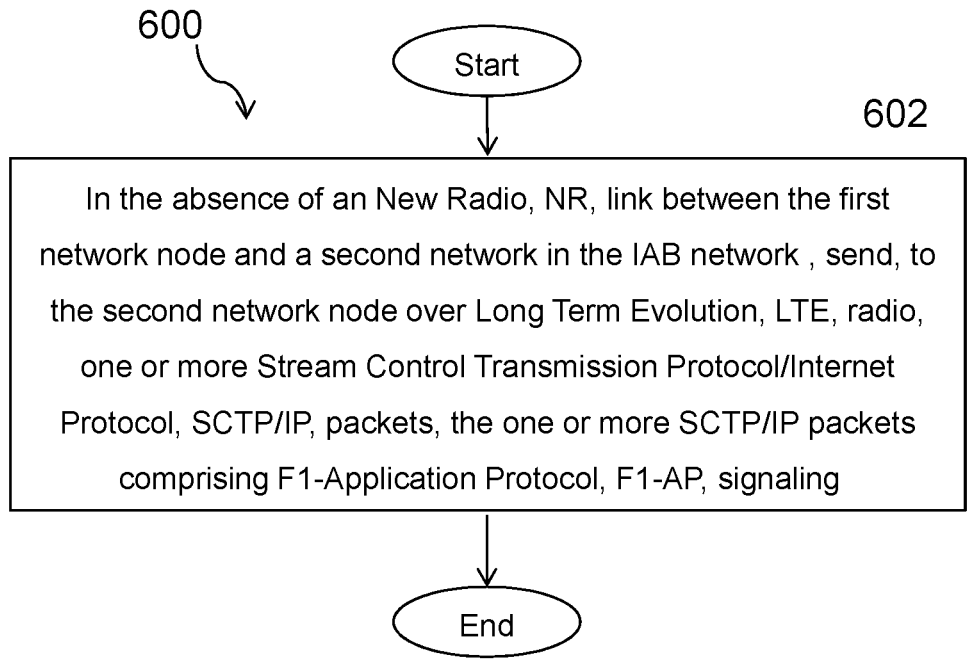
FIG. 15 illustrates an example method by a network node, according to certain embodiments.

FIG. 15 depicts another method 600 by a network node 160 in an IAB network, according to certain embodiments. The method begins at step 602 when, in the absence of an NR link between a first network node 160 and a second network in the IAB network, the first network node 160 sends, to the second network node over LTE radio, one or more SCTP/IP packets. The one or more SCTP/IP packets include F1-AP signaling.

In a particular embodiment, the one or more SCTP/IP packets include one or more whole SCTP/IP packets.

In a particular embodiment, the one or more SCTP/IP packets include IAB control plane signaling.

In a particular embodiment, the network node 160 is one of an NR Donor gNodeB, gNB, and an IAB node.

In a particular embodiment, the second network node is one of an NR Donor gNB and an IAB node.

In a particular embodiment, the first network node 160 obtains an IP address allocated for use when communicating via LTE. In a further particular embodiment, the IP address is obtained using NAS signaling. In a particular embodiment, the IP address is allocated by an OAM system.

In a further particular embodiment, the IP address may be obtained by sending a message to the OAM system and receiving, in response to the message, configuration information indicating the allocated IP address.

In a further particular embodiment, the IP address is allocated using DHCP and/or and Ipv6 host discovery.

In a further particular embodiment, the IP address is obtained in a RRC message from an LTE eNB.

In a particular embodiment, obtaining the IP address may include implicitly assigning the IP address using an IP address received in a downlink (DL) packet.

In a particular embodiment, the one or more SCTP/IP packets include the allocated IP address.

In a particular embodiment, the first network node 160 sets up an SCTP connection to the second network node. In a further particular embodiment, setting up the SCTP connection to the second network node is performed in response to an indication from the second network node that a secondary SCTP connection is required. In a further particular embodiment, setting up the SCTP connection to the second network node is performed in response to a radio link failure.

In a particular embodiment, the first network node 160 send capability information to one or more of the second node and an LTE node.

In a particular embodiment, the first network node 160 receives capability information from one or more of the second node and the LTE node.

In a particular embodiment, the first network node 160 encrypts the one or more one or more SCTP/IP packets.

In a particular embodiment, the one or more SCTP/IP packets are encrypted using IPsec.

In a particular embodiment, the one or more SCTP/IP packets are sent via X2-Application Protocol, X2-AP, and RRC signaling. In a further particular embodiment, the one or more SCTP/IP packets are embedded in X2/RRC signaling messages. In a particular embodiment, the first network node 160 may generate an F1-AP message; put the F1-AP message into an SCTP packet; put the SCTP packet in an IP Protocol Data Unit, IP PDU; put the IP PDU in an RRC message; and send the RRC message to an LTE node.

In a particular embodiment, the RRC message is an UL transfer message.

In a particular embodiment, the one or more SCTP/IP packets are sent via a separate Packet Data Network, PDN, connection with a core network. In a further particular embodiment, the first network node 160 may establish the separate PDN connection with the core network using one or more NAS protocols.

In a particular embodiment, the one or more SCTP/IP packets are sent via one of an Radio Link Control-bearer, RLC-bearer, and a radio bearer in an LTE eNB. In a further particular embodiment, the one or more SCTP/IP packets are sent via a GTP tunnel associated with the one of the RLC-bearer and the radio bearer.

FIG. 16 illustrates a schematic block diagram of an apparatus 700 in a wireless network (for example, the wireless network shown in FIG. 8). The apparatus may be implemented in a network node (e.g., network node 160 shown in FIG. 9). Apparatus 700 is operable to carry out the example method described with reference to FIG. 15 and possibly any other processes or methods disclosed herein. It is also to be understood that the method of FIG. 15 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 702, determining unit 704, communication unit 706, and any other suitable units of apparatus 700 to perform corresponding functions according one or more embodiments of the present disclosure.

In certain embodiments, apparatus 70 may be an IAB node or a Donor gNB. As illustrated in FIG. 16, apparatus 700 includes receiving unit 702, determining unit 704, and communication unit 706. Receiving unit 702 may be configured to perform the receiving functions of apparatus 700. For example, receiving unit 702 may be configured obtain an IP address allocated for use when communicating via LTE. In a further particular embodiment, receiving unit 702 may be configured obtain the IP address using NAS signaling In a particular embodiment, the IP address is allocated by an OAM system and receiving unit 702 may be configured to obtain the IP address from the OAM system. For example, receiving unit 702 may be configured to receive, from the OAM system, configuration information indicating the allocated IP address.

In a further particular embodiment, the IP address may be obtained by sending a message to the OAM system and receiving, in response to the message, configuration information indicating the allocated IP address.

In a further particular embodiment, the IP address is allocated DHCP and/or Ipv6 host discovery.

In a further particular embodiment, the IP address is obtained in a RRC message from an LTE eNB.

In a particular embodiment, obtaining the IP address may include implicitly assigning the IP address using an IP address received in a downlink (DL) packet.

In a particular embodiment, the one or more SCTP/IP packets include the allocated IP address.

As another example, receiving unit 702 may be configured to receive capability information from one or more of another network node and the LTE node. As still another example, receiving unit 702 may be configured to obtain user data.

Receiving unit 702 may receive any suitable information (e.g., from a wireless device or another network node). Receiving unit 702 may include a receiver and/or a transceiver, such as RF transceiver circuitry 172 described above in relation to FIG. 9. Receiving unit 702 may include circuitry configured to receive messages and/or signals (wireless or wired). In particular embodiments, receiving unit 702 may communicate received messages and/or signals to determining unit 704 and/or any other suitable unit of apparatus 700. The functions of receiving unit 702 may, in certain embodiments, be performed in one or more distinct unit.

Determining unit 704 may perform the processing functions of apparatus 700. For example, determining unit 704 may be configured to obtain an IP address allocated for use when communicating via LTE. In certain embodiments, determining unit 504 may be configured to implicitly assign the IP address using an IP address received in a DL packet.

As another example, determining unit 704 may be configured to set up an SCTP connection to another network node. In certain embodiments, determining unit 704 may be configured to set up the SCTP connection to the another network node in response to an indication from the another network node that a secondary SCTP connection is required. In certain embodiments, determining unit 704 may be configured to set up the SCTP connection to the another network node in response to a radio link failure.

As another example, determining unit 704 may be configured to encrypt the one or more one or more SCTP/IP packets. In certain embodiments, determining unit 504 may be configured to encrypt the one or more SCTP/IP packets using IPsec.

As another example, determining unit 704 may be configured to generate an F1-AP message; put the F1-AP message into an SCTP packet; put the SCTP packet in an IP PDU; and put the IP PDU in an RRC message.

As still another example, determining unit 704 may be configured to establish a separate PDN connection with a core network using one or more NAS protocols.

As yet another example, determining unit 704 may be configured to obtain user data.

Determining unit 704 may include or be included in one or more processors, such as processing circuitry 170 described above in relation to FIG. 9. Determining unit 704 may include analog and/or digital circuitry configured to perform any of the functions of determining unit 704 and/or processing circuitry 170 described above. The functions of determining unit 704 may, in certain embodiments, be performed in one or more distinct units.

Communication unit 706 may be configured to perform the transmission functions of apparatus 700. For example, in the absence of an NR link between a first network node 160 and a second network in the IAB network, communication unit 706 may be configured to send, to the second network node over LTE radio, one or more SCTP/IP packets. The one or more SCTP/IP packets include F1-AP signaling. In a particular embodiment, the one or more SCTP/IP packets include one or more whole SCTP/IP packets. In a particular embodiment, the one or more SCTP/IP packets include IAB control plane signaling. In a particular embodiment, the first network node 160 is one of an NR Donor gNodeB, gNB, and an IAB node. In a particular embodiment, the second network node is one of an NR Donor gNB and an IAB node.

As another example, communication unit 706 may be configured to send a message to an OAM system (e.g., requesting an IP address for use when communicating via LTE). As still another example, communication unit 706 may be configured to send capability information to one or more of another network node and an LTE node.

As yet another example, communication unit 706 may be configured to send the one or more SCTP/IP packets via X2-AP and RRC signaling. In certain embodiments, the one or more SCTP/IP packets may be embedded in X2/RRC signaling messages. In certain embodiments, communication unit 706 may be configured to send an RRC message (e.g., an UL transfer message) to an LTE node.

As another example, communication unit 706 may be configured to send the one or more SCTP/IP packets via a separate PDN connection with a core network.

As another example, communication unit 706 may be configured to send the one or more SCTP/IP packets via one of an RLC-bearer and a radio bearer in an LTE eNB. In certain embodiments, communication unit 706 may be configured to send the one or more SCTP/IP packets via a GTP tunnel associated with the one of the RLC-bearer and the radio bearer.

As another example, communication unit 706 may be configured to forward user data to a host computer or a wireless device.

Communication unit 706 may transmit messages (e.g., to a wireless device and/or another network node). Communication unit 706 may include a transmitter and/or a transceiver, such as RF transceiver circuitry 172 described above in relation to FIG. 9. Communication unit 706 may include circuitry configured to transmit messages and/or signals (e.g., through wireless or wired means). In particular embodiments, communication unit 706 may receive messages and/or signals for transmission from determining unit 704 or any other unit of apparatus 700. The functions of communication unit 504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description does not constrain this disclosure. Other changes, substitutions, and alterations are possible without departing from the spirt and scope of this disclosure.

Additional Information

At the RAN2 #106 meeting, several contributions discussed the topic of supporting IAB related signalling via LTE MCG leg for NSA deployments [1-4]. In general, the following IAB related signalling can be considered:
 IAB-MT's own RRC signalling (e.g. used for BH RLC channel management),
 IAB-MT's own PDN Connections (e.g. used for OAM signalling),
 IAB-DU's F1-AP connection.
In addition to this, the IAB node will also support F1-U data, but for that it has already been agreed that only the NR leg should be used.

This disclosure analyses the feasibility/usefulness of supporting the different signalling over the LTE MCG leg.

IAB MT's Own RRC Signalling

All IAB-related RRC signalling (such as BH RLC channel setup/modification/release) may be carried as part of the NR Cell Group configuration, as such it is trivial to support MT's own RRC signalling over LTE, since the NR SCG configuration is already transferred transparently over LTE SRBs for EN-DC.

Accordingly, it is proposed that IAB-MT-related RRC signalling should be supported via LTE leg (SRB1/2) reusing existing mechanism for handling other NR RRC Cell Group-related signalling.

IAB MT's Own PDN Connections

Given that EN-DC already supports the setup of PDN connections/EPS bearers etc. both over MCG and SCG leg it, should be possible to support OAM signalling via LTE leg, if desired.

Accordingly, it is proposed that the IAB node's MT PDN connection(s) should be possible to configure over any leg MCG/SCG as normal user plane data in EN-DC, enabling the possibility to send OAM signalling via LTE for NSA IAB node deployments.

IAB-DU's F1-AP Connection

Supporting F1-AP signalling over the LTE leg is technically more challenging and will most likely have an impact on the LTE specification and implementation.

The F1-AP/SCTP connection between the Donor CU and JAB node is delivered as any other IP traffic via the DU function of the IAB donor node and over BH RLC channels. Currently, there is no existing LTE mechanism which can be used to deliver IP traffic to the JAB node in such a way.

It has been first observed that the F1-AP/SCTP connection is delivered as any other IP traffic via the DU function of the IAB donor node and over BH RLC channels to the JAB node. Currently there is no existing LTE mechanism which can be used to deliver IP traffic to the JAB node over LTE radio in such a way.

It is not so straightforward to just deliver F1-AP message via LTE RRC as suggested in R2-1907377, "Delivery of control plane signaling to JAB nodes in NSA deployment", AT&T, since the functionalities such as addressing, reliability, etc. currently provided by SCTP and IP layers would still need to be handled in some way.

It has been additionally observed that delivering F1-AP messages via LTE RRC is not straight forward since F1-C relies on functionalities currently provided by SCTP and IP layers. In theory, it would be possible to deliver F1-AP/SCTP/IP by the JAB setting up a PDN connection to the EPC for this purpose, but in our view, this is also a quite complex solution which complicates JAB node operation/configuration.

It has been additionally observed that delivering F1-AP/SCTP/IP via a PDN connection to the EPC is possible but would increase system complexity involving both LTE/NR RAN and EPC. Given the complexities above, it may be sufficient to limit the JAB node signalling in Rel-16 to only MT's RRC and PDN connections, since most likely these are the most critical types of signalling needed to be supported via LTE e.g. to set up/reconfigure the NR leg. It should be sufficient to only perform F1 signalling via the SCG leg once the NR leg is up and running.

Accordingly, it is proposed that, given the identified complexities in supporting F1-AP via LTE MCG leg in NSA deployments, it is sufficient to limit the JAB node signalling via LTE in Rel-16 to only MT's RRC and PDN connections and support F1-C only via NR SCG leg, similar to F1-U.

In conclusion, as described above, the following observations have been made:

| | |
|---|---|
| Observation 1 | The F1-AP/SCTP connection is delivered as any other IP traffic via the DU function of the IAB donor node and over BH RLC channels to the IAB node. Currently there is no existing LTE mechanism which can be used to deliver IP traffic to the IAB node over LTE radio in such a way. |
| Observation 2 | Delivering F1-AP messages via LTE RRC is not straight forward since F1-C relies on functionalities currently provided by SCTP and IP layers. |
| Observation 3 | Delivering F1-AP/SCTP/IP via a PDN connection to the EPC is possible but would increase system complexity involving both LTE/NR RAN and EPC. |

Based on the discussion in earlier sections, the following is proposed:

| | |
|---|---|
| Proposal 1 | IAB-MT-related RRC signalling should be supported via LTE leg (SRB1/2) reusing existing mechanism for handling other NR RRC Cell Group-related signalling. |
| Proposal 2 | The IAB node's MT PDN connection(s) should be possible to configure over any leg MCG/SCG as normal user plane data in EN-DC, enabling the possibility to send OAM signalling via LTE for NSA IAB node deployments. |
| Proposal 3 | Given the identified complexities in supporting F1-AP via LTE MCG leg in NSA deployments it is sufficient to limit the IAB node signalling via LTE in Rel-16 to only MT's RRC and PDN connections and support F1-C only via NR SCG leg, similar to F1-U. |

The invention claimed is:

1. A method performed by a first network node in an Integrated Access and Wireless Access Backhaul (IAB) network, the method comprising:
in the absence of a New Radio (NR) link between the first network node and a second network node in the IAB network, sending, to the second network node over Long Term Evolution (LTE) radio, one or more Stream Control Transmission Protocol/Internet Protocol (SCTP/IP) packets, the one or more SCTP/IP packets comprising F1-Application Protocol (F1-AP) signaling.

2. The method of claim 1, wherein the one or more SCTP/IP packets comprise IAB control plane signaling.

3. The method of claim 1, further comprising:
obtaining an Internet Protocol (IP) address allocated for use when communicating via LTE.

4. The method of claim 3, wherein the IP address is obtained using Non-Access Stratum (NAS) signaling.

5. The method of claim 4, wherein obtaining the IP address comprises:
sending a message to an operations and maintenance (OAM) system; and
receiving, in response to the message, configuration information indicating the allocated IP address.

6. The method of claim 3, wherein the IP address is obtained in a Radio Resource Control (RRC) message from an LTE eNodeB (LTE eNB).

7. The method of claim 3, wherein obtaining the IP address comprises:
implicitly assigning the IP address using an IP address received in a downlink (DL) packet.

8. The method of claim 3, wherein the one or more SCTP/IP packets include the allocated IP address.

9. The method of claim 1, further comprising:
setting up an SCTP connection to the second network node.

10. The method of claim 9, wherein setting up the SCTP connection to the second network node is performed in response to a radio link failure.

11. The method of claim 1, further comprising:
sending capability information to one or more of the second node and an LTE node.

12. The method of claim 1, further comprising:
receiving capability information from one or more of the second node and the LTE node.

13. The method of claim 1, wherein the one or more SCTP/IP packets are sent via X2-Application Protocol (X2-AP) and RRC signaling.

14. The method of claim 1, comprising:
generating an F1-AP message;
putting the F1-AP message into an SCTP packet;
putting the SCTP packet in an IP Protocol Data Unit (IP PDU);
putting the IP PDU in an RRC message; and
sending the RRC message to an LTE node.

15. The method of claim 1, further comprising establishing a separate Packet Data Network (PDN) connection with a core network using one or more NAS protocols wherein the one or more SCTP/IP packets are sent via the separate PDN connection with the core network.

16. A first network node in an Integrated Access and Wireless Access Backhaul (IAB) network, the network node comprising:
processing circuitry configured to:
in the absence of a New Radio (NR) link between the first network node and a second network node in the IAB network, send, to the second network node over Long Term Evolution (LTE) radio, one or more Stream Control Transmission Protocol/Internet Protocol (SCTP/IP) packets, the one or more SCTP/IP packets comprising F1-Application Protocol (F1-AP) signaling.

17. The first network node of claim 16, wherein the one or more SCTP/IP packets comprise IAB control plane signaling.

18. The first network node of claim 16, wherein the processing circuitry is configured to obtain an Internet Protocol (IP) address allocated for use when communicating via LTE.

19. The first network node of claim 18, wherein the IP address is obtained using Non-Access Stratum (NAS) signaling.

20. The first network node of claim 18, wherein the IP address is obtained in a Radio Resource Control (RR) message from an LTE eNodeB (LTE eNB).

21. The first network node of claim 18, wherein when obtaining the IP address the processing circuitry is configured to implicitly assign the IP address using an IP address received in a downlink (DL) packet.

22. The first network node of claim 16, wherein the processing circuitry is configured to set up an SCTP connection to the second network node.

23. The first network node of claim 22, wherein the processing circuitry is configured to set up the SCTP connection to the second network node in response to a radio link failure.

24. The first network node of claim 16, wherein the processing circuitry is configured to send capability information to one or more of the second node and an LTE node.

25. The first network node of claim 16, wherein the processing circuitry is configured to receive capability information from one or more of the second node and the LTE node.

26. The first network node of claim 16, wherein the processing circuitry is configured to:
generate an F1-AP message;
put the F1-AP message into an SCTP packet;
put the SCTP packet in an IP Protocol Data Unit (IP PDU);
put the IP PDU in an RRC message; and
send the RRC message to an LTE node.

* * * * *